United States Patent
Wang et al.

(10) Patent No.: US 12,452,860 B2
(45) Date of Patent: Oct. 21, 2025

(54) SEMIAUTONOMOUS UPLINK SCHEDULING

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 17/838,095

(22) Filed: Jun. 10, 2022

(65) Prior Publication Data

US 2023/0403698 A1 Dec. 14, 2023

(51) Int. Cl.
| | |
|---|---|
| *H04W 72/12* | (2023.01) |
| *H04L 5/00* | (2006.01) |
| *H04W 72/04* | (2023.01) |
| *H04W 72/0446* | (2023.01) |
| *H04W 72/0453* | (2023.01) |
| *H04W 72/08* | (2009.01) |
| *H04W 72/1268* | (2023.01) |
| *H04W 72/541* | (2023.01) |

(52) U.S. Cl.
CPC ....... *H04W 72/1268* (2013.01); *H04L 5/0051* (2013.01); *H04W 72/0446* (2013.01); *H04W 72/0453* (2013.01); *H04W 72/541* (2023.01)

(58) Field of Classification Search
CPC .......... H04W 72/1268; H04W 72/541; H04W 72/0446; H04W 72/0453; H04L 5/0051
See application file for complete search history.

(56) References Cited

U.S. PATENT DOCUMENTS

| | | | | |
|---|---|---|---|---|
| 10,201,016 B2 * | 2/2019 | Dabeer | ............. | H04W 74/0833 |
| 2018/0115347 A1 * | 4/2018 | Yerramalli | ........ | H04W 74/0808 |

FOREIGN PATENT DOCUMENTS

WO WO-2021008174 A1 1/2021

OTHER PUBLICATIONS

International Search Report and Written Opinion—PCT/US2023/018054—ISA/EPO—Jul. 10, 2023.

* cited by examiner

*Primary Examiner* — Melvin C Marcelo

(74) *Attorney, Agent, or Firm* — Holland & Hart LLP

(57) ABSTRACT

Methods, systems, and devices for wireless communication at a user equipment (UE) are described. A UE may receive control signaling including an indication of time and frequency resources that are configured for semiautonomous uplink scheduling from the UE. The UE may then transmit a semiautonomous uplink scheduling message including a request for a set of uplink transmission resources or parameters for an upcoming uplink transmission. The UE may determine the set of uplink transmission resources or parameters based on one or more interference measurements performed on the time and frequency resources that are configured for semiautonomous uplink scheduling from the UE. The UE may then receive, in response to transmitting the semiautonomous uplink scheduling message, a message approving or declining the request for the set of uplink transmission resources or parameters.

30 Claims, 16 Drawing Sheets

SEMIAUTONOMOUS UPLINK SCHEDULING

FIELD OF TECHNOLOGY

The following relates to wireless communication at a user equipment (UE), including semiautonomous uplink scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, one or more network entities and one or more UEs may transmit messages between one another. In some cases, a network entity may transmit control messages indicating scheduling decisions for the UE for uplink transmissions. However, techniques for scheduling decisioning for the UE may be improved.

SUMMARY

The described techniques relate to improved methods, systems, devices, and apparatuses that support semiautonomous uplink scheduling. For example, the described techniques provide for semiautonomous uplink scheduling of a set of uplink transmission resources and parameters. In some wireless communication systems, a user equipment (UE) may schedule an uplink transmission based on uplink parameters and transmission resources. For example, the UE may perform one or more interference measurements to determine the uplink parameters and transmission resources. The UE may request for the uplink parameters and transmission resources in a semiautonomous scheduling message. The network entity may then transmit a message approving or declining the request, thus providing a system for the UE to request uplink resources and parameters prior to performing an uplink transmission.

A method for wireless communication at a user equipment (UE) is described. The method may include receiving control signaling including an indication of time and frequency resources that are configured for semiautonomous uplink scheduling from the UE, transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and receiving, in response to transmitting the semiautonomous uplink scheduling message, a message approving or declining the request for the set of multiple uplink transmission resources or parameters.

An apparatus for wireless communication at a UE is described. The apparatus may include a processor, memory coupled with the processor, and instructions stored in the memory. The instructions may be executable by the processor to cause the apparatus to receive control signaling including an indication of time and frequency resources that are configured for semiautonomous uplink scheduling from the UE, transmit a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and receive, in response to transmitting the semiautonomous uplink scheduling message, a message approving or declining the request for the set of multiple uplink transmission resources or parameters.

Another apparatus for wireless communication at a UE is described. The apparatus may include means for receiving control signaling including an indication of time and frequency resources that are configured for semiautonomous uplink scheduling from the UE, means for transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and means for receiving, in response to transmitting the semiautonomous uplink scheduling message, a message approving or declining the request for the set of multiple uplink transmission resources or parameters.

A non-transitory computer-readable medium storing code for wireless communication at a UE is described. The code may include instructions executable by a processor to receive control signaling including an indication of time and frequency resources that are configured for semiautonomous uplink scheduling from the UE, transmit a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and receive, in response to transmitting the semiautonomous uplink scheduling message, a message approving or declining the request for the set of multiple uplink transmission resources or parameters.

In some examples of the method, apparatuses, and non-transitory computer-readable medium described herein, receiving the control signaling may include operations, features, means, or instructions for receiving an indication of one or more uplink bandwidth parts that may be configured for semiautonomous uplink scheduling from the UE.

Some examples of the method, apparatuses, and non-transitory computer-readable medium described herein may further include operations, features, means, or instructions for receiving an indication of a starting positioning with reference to a physical resource block index or a frequency offset to a reference point associated with the one or more uplink bandwidth parts that may be configured for semiautonomous uplink scheduling from the UE.

Some examples of the method, apparatuses, and non-transitory computer-readable medium described herein may further include operations, features, means, or instructions for receiving signaling including a request for the UE to switch from a first uplink bandwidth part of the one or more uplink bandwidth parts to a second uplink bandwidth part of the one or more uplink bandwidth parts, where the one or more interference measurements may be performed on the second uplink bandwidth part.

In some examples of the method, apparatuses, and non-transitory computer-readable medium described herein, the indication of the one or more uplink bandwidth parts includes a bitmap indicating an index for the one or more uplink bandwidth parts and the index includes at least one of a subframe index, a slot index, a symbol index, or a combination thereof.

In some examples of the method, apparatuses, and non-transitory computer-readable medium described herein, the one or more uplink bandwidth parts correspond to one or more flexible slots.

Some examples of the method, apparatuses, and non-transitory computer-readable medium described herein may further include operations, features, means, or instructions for receiving an indication of a first uplink bandwidth part that may be configured for uplink scheduling from a network entity and a second uplink bandwidth part that may be configured for semiautonomous uplink scheduling from the UE and receiving signaling including a request for the UE to switch from the first uplink bandwidth part to the second uplink bandwidth part, where the one or more interference measurements may be performed on the second uplink bandwidth part.

Some examples of the method, apparatuses, and non-transitory computer-readable medium described herein may further include operations, features, means, or instructions for performing the one or more interference measurements on the time and frequency resources that may be configured for semiautonomous uplink scheduling from the UE and determining the set of multiple uplink transmission resources or parameters based on performing the one or more interference measurements.

Some examples of the method, apparatuses, and non-transitory computer-readable medium described herein may further include operations, features, means, or instructions for receiving a modification request to modify the set of multiple uplink transmission resources requested for the upcoming uplink transmission.

In some examples of the method, apparatuses, and non-transitory computer-readable medium described herein, receiving the message approving or declining the request may include operations, features, means, or instructions for receiving, via a physical downlink control channel, a set of uplink transmission resources different from the set of multiple uplink transmission resources requested for the upcoming uplink transmission.

Some examples of the method, apparatuses, and non-transitory computer-readable medium described herein may further include operations, features, means, or instructions for determining that the set of uplink transmission resources may be less than a threshold, or that a transport block segmentation may be not permitted, or that a time associated with transport block segmentation may be greater than a configured time gap and dropping the upcoming uplink transmission based on the determining.

Some examples of the method, apparatuses, and non-transitory computer-readable medium described herein may further include operations, features, means, or instructions for determining that the set of uplink transmission resources overlaps with a second uplink transmission having a same or greater priority than the upcoming uplink transmission and dropping the upcoming uplink transmission based on the determining.

Some examples of the method, apparatuses, and non-transitory computer-readable medium described herein may further include operations, features, means, or instructions for dropping the upcoming uplink transmission based on determining that the set of uplink transmission resources exceeds a packet latency bound.

Some examples of the method, apparatuses, and non-transitory computer-readable medium described herein may further include operations, features, means, or instructions for padding a transport block in the upcoming uplink transmission based on determining that the set of uplink transmission resources may be greater than the set of multiple uplink transmission resources requested for the upcoming uplink transmission.

Some examples of the method, apparatuses, and non-transitory computer-readable medium described herein may further include operations, features, means, or instructions for determining that the set of uplink transmission resources may be greater than the set of multiple uplink transmission resources requested for the upcoming uplink transmission and performing a rate-matching to the set of uplink transmission resources with one or more bits using a circular buffer.

In some examples of the method, apparatuses, and non-transitory computer-readable medium described herein, the set of multiple uplink transmission resources or parameters include at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based on a channel state information and a buffer size, or a combination thereof.

In some examples of the method, apparatuses, and non-transitory computer-readable medium described herein, the one or more interference measurements include at least one of a synchronization signal block measurement, a channel state information reference signal measurement, or both.

A method for wireless communication at a network entity is described. The method may include transmitting, to a UE, control signaling including an indication of time and frequency resources that are configured for semiautonomous uplink scheduling from the UE, receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and transmitting, to the UE and in response to transmitting the semiautonomous uplink scheduling message, a message approving or declining the request for the set of multiple uplink transmission resources or parameters.

An apparatus for wireless communication at a network entity is described. The apparatus may include a processor, memory coupled with the processor, and instructions stored in the memory. The instructions may be executable by the processor to cause the apparatus to transmit, to a UE, control signaling including an indication of time and frequency resources that are configured for semiautonomous uplink scheduling from the UE, receive a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and transmit, to the UE and in response to transmitting the semiautonomous uplink scheduling message, a message approving or declining the request for the set of multiple uplink transmission resources or parameters.

Another apparatus for wireless communication at a network entity is described. The apparatus may include means for transmitting, to a UE, control signaling including an indication of time and frequency resources that are configured for semiautonomous uplink scheduling from the UE, means for receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and means for transmitting, to the UE and in response to transmitting the semiautonomous uplink scheduling message, a message approving or declining the request for the set of multiple uplink transmission resources or parameters.

A non-transitory computer-readable medium storing code for wireless communication at a network entity is described. The code may include instructions executable by a processor to transmit, to a UE, control signaling including an indication of time and frequency resources that are configured for semiautonomous uplink scheduling from the UE, receive a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE, and transmit, to the UE and in response to transmitting the semiautonomous uplink scheduling message, a message approving or declining the request for the set of multiple uplink transmission resources or parameters.

In some examples of the method, apparatuses, and non-transitory computer-readable medium described herein, transmitting the control signaling may include operations, features, means, or instructions for transmitting, to the UE, an indication of one or more uplink bandwidth parts that may be configured for semiautonomous uplink scheduling from the UE.

Some examples of the method, apparatuses, and non-transitory computer-readable medium described herein may further include operations, features, means, or instructions for transmitting, to the UE, an indication of a starting positioning with reference to a physical resource block index or a frequency offset to a reference point associated with the one or more uplink bandwidth parts that may be configured for semiautonomous uplink scheduling from the UE.

Some examples of the method, apparatuses, and non-transitory computer-readable medium described herein may further include operations, features, means, or instructions for transmitting, to the UE, signaling including a request for the UE to switch from a first uplink bandwidth part of the one or more uplink bandwidth parts to a second uplink bandwidth part of the one or more uplink bandwidth parts, where the one or more interference measurements may be performed on the second uplink bandwidth part.

In some examples of the method, apparatuses, and non-transitory computer-readable medium described herein, the indication of the one or more uplink bandwidth parts includes a bitmap indicating an index for the one or more uplink bandwidth parts and the index includes at least one of a subframe index, a slot index, a symbol index, or a combination thereof.

In some examples of the method, apparatuses, and non-transitory computer-readable medium described herein, the one or more uplink bandwidth parts correspond to one or more flexible slots.

Some examples of the method, apparatuses, and non-transitory computer-readable medium described herein may further include operations, features, means, or instructions for transmitting, to the UE, an indication of a first uplink bandwidth part that may be configured for uplink scheduling from the network entity and a second uplink bandwidth part that may be configured for semiautonomous uplink scheduling from the UE and transmitting, to the UE, signaling including a request for the UE to switch from the first uplink bandwidth part to the second uplink bandwidth part, where the one or more interference measurements may be performed on the second uplink bandwidth part.

Some examples of the method, apparatuses, and non-transitory computer-readable medium described herein may further include operations, features, means, or instructions for transmitting, to the UE, a modification request to modify the set of multiple uplink transmission resources requested for the upcoming uplink transmission.

In some examples of the method, apparatuses, and non-transitory computer-readable medium described herein, transmitting the message approving or declining the request may include operations, features, means, or instructions for transmitting, to the UE and via a physical downlink control channel, a set of uplink transmission resources different from the set of multiple uplink transmission resources requested for the upcoming uplink transmission.

In some examples of the method, apparatuses, and non-transitory computer-readable medium described herein, the set of multiple uplink transmission resources or parameters include at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based on a channel state information and a buffer size, or a combination thereof.

In some examples of the method, apparatuses, and non-transitory computer-readable medium described herein, the one or more interference measurements include at least one of a synchronization signal block measurement, a channel state information reference signal measurement, or both.

DETAILED DESCRIPTION

Figure 1:
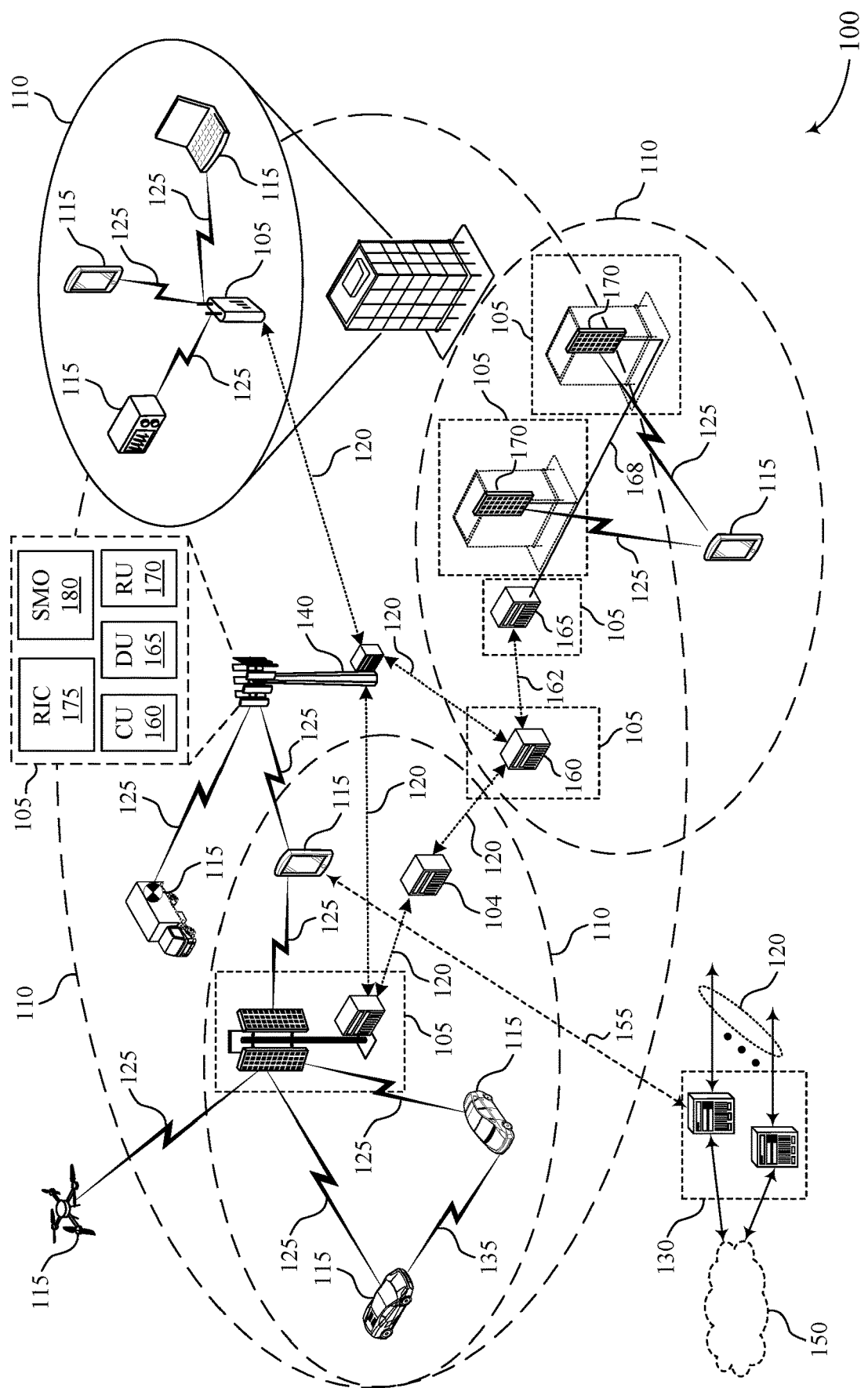
FIG. 1 illustrates an example of a wireless communications system that supports semiautonomous uplink scheduling in accordance with one or more aspects of the present disclosure.

Wireless communication systems (e.g., New Radio (NR)) may support network entities and UEs transmitting messages between one another. In some cases, a network entity may transmit a grant via a physical downlink control channel (PDCCH), to schedule uplink transmissions based on feedback from the UE. For uplink transmissions, the network entity may determine one or more parameters (e.g., rank, modulation and coding scheme (MCS), etc.) and one or more resources for the UE. For example, the UE may transmit a feedback indicating a channel state information (CSI) and a buffer status report (BSR), and the network entity may provide both resources and transmission parameters in the uplink grant upon receiving the CSI and the BSR. The UE may provide such feedback in the form of reported resources and transmission parameters for the network entity to schedule the uplink transmission via a physical uplink shared channel (PUSCH). However, centralized scheduling decisions at the network entity may increase latency, in some cases. For instance, higher latency may occur when the scheduling decision is based on a UE's BSR and CSI, thus incurring high signaling overhead.

Additionally or alternatively, there may be some inefficiency when a scheduling decision is based on outdated BSR and CSI which may include re-transmissions or higher usage of radio resources. For example, the network entity may schedule an uplink transmission based on an outdated BSR or CSI, while the UE may continue to transmit (or attempt to transmit) an updated set of resources and parameters. In some cases, the UE may expend higher power to send an uplink transmission, and thereby increase interference to other UEs (e.g., sporadic interference). In other examples, the network entity may schedule additional re-transmissions of the transmission parameters and resources which may lead to inefficient usage of radio resources.

The described techniques relate to improved methods, systems, devices, or apparatuses that support semiautonomous uplink scheduling at the UE. In some wireless communication systems, semiautonomous uplink scheduling may allow the network entity to configure a semiautonomous uplink scheduling resources to the UE. That is, the network entity may configure one or more time domain resources and a dedicated uplink bandwidth part for the semiautonomous uplink communication. As such, the UE may receive the control signaling indicating time and frequency resources configured for semiautonomous uplink scheduling from the UE.

In some examples, the UE may determine one or more uplink transmission resources and parameters based on a current buffer size and CSI. Based on the one or more interference measurements performed on the time and frequency resources configured for the semiautonomous uplink scheduling from the UE, the UE may transmit a semiautonomous uplink scheduling message requesting a set of uplink transmission resources and parameters. The network entity may receive the semiautonomous uplink scheduling message and may decide to approve or decline (e.g., in whole or in part) the request for the set of uplink transmission resources or parameters. In some examples, the network entity may decide to approve the request (or aspects of the request) for the set of uplink transmission resources and parameters, and may send an uplink grant (e.g., a light uplink grant) to the UE. Such uplink grant may indicate a possible modification to the requested set of uplink transmission resources and parameters (e.g., based on the request and one or more local constraints). The UE may then transmit an uplink transmission in accordance with the uplink grant.

Particular aspects of the subject matter described herein may be implemented to realize one or more potential advantages. The described techniques may provide for enhanced transmissions without wasting potential resources. In some cases, the wireless communication system may experience lower delays and lower latency for messages transmitted between network entities and UEs. As such, techniques utilizing the abilities of UEs to schedule uplink transmissions may allow more freedom for UEs to request resources and parameters. In some cases, UEs with the ability to decide uplink parameters and resources based on CSI and BSR, may allow for more modem designs at the UE.

Aspects of the disclosure are initially described in the context of wireless communications systems. Aspects of the disclosure are further illustrated by and described with reference to apparatus diagrams, system diagrams, and flowcharts that relate to semiautonomous uplink scheduling.

FIG. 1 illustrates an example of a wireless communications system 100 that supports semiautonomous uplink scheduling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support semiautonomous uplink scheduling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the network entity 105 may transmit a grant (e.g., uplink grant) to the UE via PDCCH to schedule uplink transmissions. The UE 115 may transmit a message to the network entity 105 using resources scheduled by a control signal (e.g., downlink control information (DCI) or RRC). In some examples, for PUSCH scheduling, there may be multiple DCI formats (e.g., DCI0_0, DCI 0_1, and DCI 0_2) which may support both dynamic grants and configured grants (e.g., CG-type-2). In some examples, the DCI format, DCI 0_1 may include one or more of a carrier indicator, an uplink or supplementary uplink (SUL) indicator, a bandwidth part indicator, a time domain resource allocation (TDRA), a frequency domain resource allocation (FDRA), a frequency hopping flag, an MCS, a new data indicator (NDI), a redundancy version (RV), a HARQ process number, first and second downlink assignment index, a transmit power control (TPC) for PUSCH, a sounding reference signal (SRS) resource indication (SRI), a precoding information, a number of layers, a number of antenna ports, an SRS request, a CSI request, a CBGTI, phase tracking reference signal, a demodulation reference signal, beta, a demodulation reference signal sequence initial, or the like. In some instances, radio resource control scheduling may support CG type-1 scheduling. In some examples, a network entity 105 may determine the information (e.g., rank, MCS, RRC, or the like) in the uplink transmission (in a grant). As such, the network entity 105 may provide both resources and transmission parameters in the grant. In some instances, TDRA, FDRA, and frequency hopping flags may indicate the time and frequency resources for the scheduled PUSCH. In addition, the MCS and RV may provide additional transmission parameters for the PUSCH.

According to one or more aspects of the present disclosure, the UE 115 may receive control signaling including an indication of time and frequency resources that are configured for semiautonomous uplink scheduling by the UE 115. In some examples, the UE 115 may transmit a semiautonomous uplink scheduling message comprising a request for a set of uplink transmission resources or parameters for an upcoming uplink transmission. In some examples, the set of uplink transmission resources or parameters may be based on one or more interference measurements performed on the time and frequency resources that are configured for semiautonomous uplink scheduling from the UE 115. In some examples, the UE 115 may then receive, in response to transmitting the semiautonomous uplink scheduling message, a message approving or declining the request (or aspects of the request) for the set of uplink transmission resources or parameters.

Figure 2:
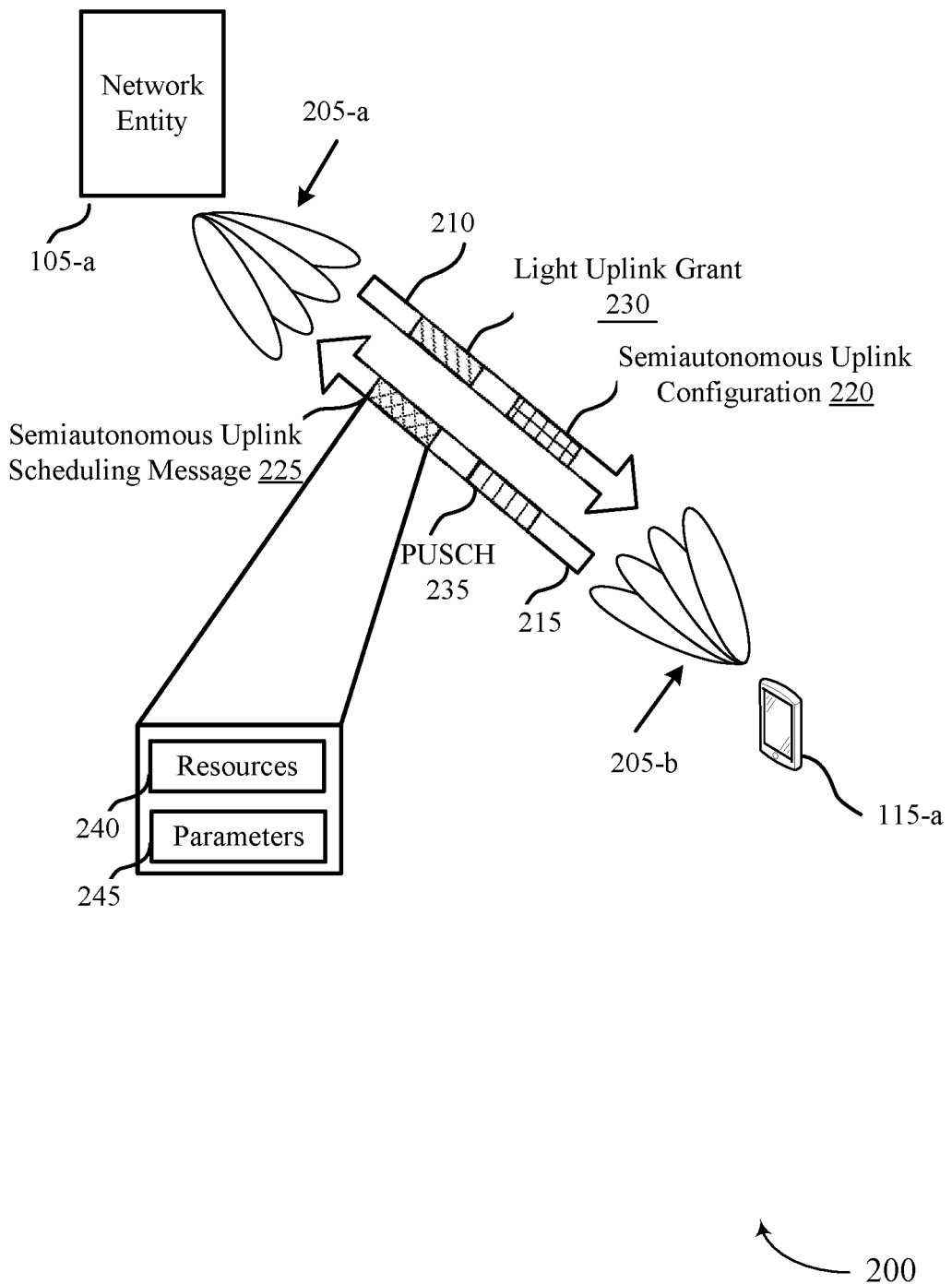
FIG. 2 illustrates an example of a wireless communications system that supports semiautonomous uplink scheduling in accordance with one or more aspects of the present disclosure.

FIG. 2 illustrates an example of a wireless communications system 200 that supports semiautonomous uplink scheduling in accordance with one or more aspects of the present disclosure. In some examples, the wireless communications system 200 may implement aspects of the wireless communications system 100. The wireless communications system 200 may include a UE 115-a and a network entity 105-a, which may be examples of corresponding devices as described herein, including with reference to FIG. 1.

In some examples, a network entity may suffer from high latency and inefficiency. In some cases, higher latency may occur when the network entity bases a scheduling decision for a UE based on the BSR and CSI sent from the UE 115. Using a centralized scheduling system may incur high signaling overhead and latency. In some examples, the network entity may schedule a new packet transmission while the UE may request a re-transmission of a failed packet. In some cases, a mismatch of transmissions may occur in New Radio Unlicensed (NR-U) where the UE may receive Type-3 HARQ codebook (CB) via downlink feedback information (DFI) which may indicate a failed uplink reception due to listen before talk procedure.

In other cases, inefficiency may occur when the scheduling decision is based on an outdated BSR and CSI, which may lead to extra re-transmissions and inefficient usage of radio resources. For example, the network entity may identify MCS and number of layers based on CSI feedback from the UE or from SRS measurements. In some examples, the UE may transmit a CSI-RS to the network entity periodically (e.g., 10 ms intervals) where the network entity 105-a may determine the MCS based on the feedback from the UE 115-a. However, the UE may transmit a current CSI-RS measurement at a first time, and the network entity may set the MCS based on a previous CSI-RS measurement. In some cases, the UE may measure the CSI which is more accurate than the CSI used by the network entity. In some cases, using the transmission parameters provided by the network entity based on a previously calculated CSI may prove inefficient. The UE may spend extra power which may increase interference to surrounding UEs. In some cases, the UE may obtain an interference measurement (e.g., sporadic interference) that is more accurate than the interference measurement at the network entity 105-a. In other examples, the UE may measure the CSI which is less accurate than the CSI at the network entity. In some instances, the UE may measure an instantaneous interference so that the network entity may receive the transmission via PUSCH but may be unable to decode it. In such instances, the inability to decode the PUSCH may lead to higher error rates and re-transmissions.

One or more techniques of the present disclosure relate to methods, systems, devices, or apparatuses to decrease latency and inefficiency in a wireless communications system 200. In some implementations, the wireless communications system 200 may support semiautonomous uplink scheduling between the network entity 105-a and the UE 115-a. In some examples, the network entity 105-a may communicate with the UE 115-a using one or more beams 205-a. In some examples, the UE 115-a may transmit signaling to the network entity 105-a using one or more beams 205-b directed to the network entity 105-a. The UE 115-a and the network entity 105-a may communicate using downlink communication channel 210 and uplink communication channel 215.

In some examples, the network entity 105-a may configure semiautonomous uplink scheduling to the UE 115-a included in a semiautonomous uplink configuration 220. The network entity 105-a may receive control signaling including the semiautonomous uplink configuration 220. The semiautonomous uplink configuration 220 may include an indication of time and frequency resources that are configured for semiautonomous uplink scheduling from the UE 115-a. For instance, the semiautonomous uplink configuration 220 may be included in a message (e.g., via RRC and/or MAC-CE) indicating the time and frequency resources where semiautonomous uplink is allowed for the UE 115-a. In some cases, the network entity 105-a may dedicate an uplink bandwidth part for semiautonomous uplink scheduling, where the semiautonomous uplink is based on a time domain resource. In some examples, the network entity 105-a may configure the uplink bandwidth part based on one or more uplink bandwidth parts supporting semiautonomous uplink (semiautonomous uplink bandwidth part). For example, the UE 115-a may receive an indication of a starting positioning with reference to a physical resource block index or a frequency offset to a reference point associated with the one or more uplink bandwidth parts that are configured for semiautonomous uplink scheduling from the UE 115-a. As such, the configuration of the semiautonomous uplink bandwidth part may indicate starting positioning in terms of physical resource block index or frequency offset to a reference point and the bandwidth of the semiautonomous uplink bandwidth part. In addition, the semiautonomous uplink bandwidth part may not be associated with or be based on transmitting BSR and CSI feedback to the network entity 105-a (as the UE 115-a may configure the uplink transmission parameters).

In some cases, the UE 115-a may switch between bandwidth parts. In some examples, the UE 115-a may receive signaling including a request for the UE 115-a to switch from a first uplink bandwidth part of the one or more uplink bandwidth parts to a second uplink bandwidth part of the one or more uplink bandwidth parts. In some examples, the UE 115-a may perform one or more interference measurements on the second uplink bandwidth part after switching. For example, the network entity 105-a may configure the UE 115-a for semiautonomous uplink bandwidth part and an NR uplink bandwidth part. In some instances, if the network entity 105-a indicates to the UE 115-a to switch to NR uplink bandwidth part, the semiautonomous uplink bandwidth part may be deactivated. In other examples, the network entity 105-a may configure the UE 115-a for switching on semiautonomous uplink bandwidth parts (between two or more semiautonomous uplink bandwidth parts) and not to switch to an NR uplink bandwidth part. For example, the UE 115-a may switch among semiautonomous uplink bandwidth parts if semiautonomous uplink bandwidth parts are configured by the network entity 105-a and available for the UE 115-a. In addition, the network entity 105-a may transmit a bitmap indicating different indexes (e.g., subframe, slot, symbol) based on time resources for the semiautonomous uplink bandwidth part. For instance, the indication of the one or more uplink bandwidth parts may include a bitmap indicating an index for the one or more uplink bandwidth parts. In some examples, the index may include at least one of a subframe index, a slot index, a symbol index, or a combination thereof. The one or more uplink bandwidth parts may correspond to one or more flexible slots. That is, the semiautonomous uplink bandwidth part may apply to slots and symbols deemed as flexible and not semi-static (e.g., 'U' slots or symbols in TDD bands).

In some examples, the UE 115-a may receive from the network entity 105-a, a control signaling indicating time and frequency resources for semiautonomous uplink included in a semiautonomous uplink configuration 220. In some cases, the UE 115-a may perform synchronization signal block measurement, a channel state information reference signal measurement, and other interference measurements on the configured semiautonomous uplink bandwidth part to obtain the CSI of the channel conditions. In some implementations, the UE 115-a may specify one or more of a number of resources (e.g., symbols and resource blocks), a number of layers, demodulation reference signal, phase tracking reference signal density, a transmit power, MCS, RV-ID, TDRA/FDRA Start and Length Indicator (SLIV), HARQ-ID based on CSI and buffer size, capability for a potential PUSCH transmission, or the like.

Additionally or alternatively, the UE 115-a may use semiautonomous uplink configuration 220 and the one or more interference measurements to determine the set of uplink transmission resources 240 or parameters 245 for an upcoming uplink transmission included in a semiautonomous uplink scheduling message 225. In some cases, the UE 115-a may transmit the semiautonomous uplink scheduling message 225 via communication channel 215. The semiautonomous uplink scheduling message 225 may include an indication of the uplink resources 240 or parameters 245. For example, the UE 115-a may indicate PUSCH parameters, such as configuring periodic resources for transmission of the PUSCH indication message (e.g., via a PUCCH format carrying a few bits indicating the PUSCH parameters). In some instances, the resource indication in the semiautonomous uplink scheduling message 225 (e.g., the PUSCH indication message) may indicate the number of resources for transmitting the subsequent PUSCH. In some cases, the network entity 105-a may indicate the accurate time and frequency resources in PDCCH scheduling the PUSCH (e.g., TDRA and FDRA).

Additionally or alternatively, the semiautonomous uplink scheduling message 225 may include one or both symbols and PRB indication. In some cases, the UE 115-a may include symbols and PRB for transmitting the subsequent PUSCH. In addition, the network entity 105-a may indicate the starting position of the PUSCH transmission based on the time and frequency domain within the configured semiautonomous uplink bandwidth part. In addition, the semiautonomous uplink scheduling message 225 may indicate time and frequency resources separately.

Additionally or alternatively, the PUSCH indication message (e.g., semiautonomous uplink scheduling message 225) may include one or both TDRA and FDRA indications to indicated a selected TDRA and/or FDRA for a subsequent transmission. In some cases, the network entity 105-a may approve or decline the request (e.g., using 1 bit) or conditionally approve (e.g., a few bits indicating modification to the UE requested SLIV of time and frequency resources, or transmitting an offset SLIV). In such cases, the network entity 105-a may transmit, via a PDCCH, a set of uplink transmission resources different from the set of uplink transmission resources requested for the upcoming uplink transmission.

Additionally or alternatively, the UE 115-a may indicate multiple TDRA and/or FDRA in the semiautonomous uplink scheduling message 225 (e.g., PUSCH indication message). In some examples, the UE 115-a may indicate a set of preferred TDRA and FDRA for subsequent PUSCH transmissions (e.g., 2 symbols×10 PRB, 10 symbols×2 PRBs, or the like). In some instances, the network entity 105-a may approve or decline the one or more PUSCH options. In addition, the PUSCH indication message may use time and frequency resources separately. In addition, the PUSCH indication message may use time and frequency resources separately.

In some cases, the UE 115-a may configure the PUSCH indication message along with the other resources 240 and parameters 245 and transmit the semiautonomous uplink scheduling message 225 to the network entity 105-a. The network entity 105-a may evaluate the semiautonomous uplink scheduling message 225, and the network entity 105-a may either approve or decline the uplink resources and parameters requested by the UE 115-a. In some cases, the network entity 105-a may approve the UE 115-a scheduling parameters 245 and resources 240 in the semiautonomous uplink scheduling message 225 and notify the UE 115-*a* via a light uplink grant 230. The UE 115-*a* may use the light grant 230 to transmit the PUSCH 235. Alternatively, the network entity 105-*a* may decline the resources 240 and parameters 245 requested in the semiautonomous uplink scheduling message 225 and may transmit a different set of resources and parameters in the light uplink grant 230. In some instances, the light uplink grant 230 may decline the uplink scheduling request based on local constraints and may modify the uplink scheduling resources and parameters for the UE 115-*a*. In some examples, the UE 115-*a* may transmit the PUSCH 235 via communication channel 215.

As depicted herein, the network entity 105-*a* may not approve or allocate resources as requested by the UE 115-*a*. In such cases, the UE 115-*a* may drop the PUSCH transmission if the number of resource elements approved by the network entity 105-*a* is smaller than a configured threshold. Additionally or alternatively, the UE 115-*a* may drop the PUSCH transmission if the number of resource elements approved by the network entity 105-*a* is smaller than a configured threshold and a transport block segmentation is not allowed by upper layer. In some examples, the UE 115-*a* may drop the PUSCH transmission if the number of resource elements approved by the network entity 105-*a* is smaller than a configured threshold and a transport block segmentation takes longer time such that the UE 115-*a* may not transmit before the scheduled PUSCH (e.g., preparation time is longer than the time gap between PUSCH grant and PUSCH).

In some examples, the UE 115-*a* may drop the PUSCH transmission if an approved PUSCH overlaps with another PUSCH transmission and the other PUSCH has the same or higher priority. The UE 115-*a* may drop the PUSCH transmission if the approved PUSCH transmission exceeds the packet latency bound. In some examples, the number of resource elements approved by the network entity 105-*a* may be larger than the number of resource elements requested by the UE 115-*a*. In such cases, the UE 115-*a* may perform padding to the transport block so that the transport block size is adjusted to the number of resource elements matches the number of resource elements approved by the network entity 105-*a*. In some examples, the UE 115-*a* may include more demodulation reference signals and phase tracking reference signals with uplink control indication.

According to one or more aspects of the present disclosure, the UE 115-*a* may determine that a set of uplink transmission resources granted by the network entity 105-*a* is greater than a set of uplink transmission resources requested (using uplink control indication) for an upcoming uplink transmission. In such cases, the UE 115-*a* may perform a rate-matching to the granted set of uplink transmission resources with one or more bits using a circular buffer. In one example, when the UE 115-*a* requests M1 symbols and N1 physical resource blocks, the network entity 105-*a* may approve M2 symbols and N2 physical resource blocks, where M2×N2>M1×N1. In such cases, the UE 115-*a* may perform padding to the transport block or may include reference signals (e.g., demodulation reference signal, phase tracking reference signal, etc.) if the different between the requested resources and parameters and the granted resources and parameters is within a threshold. In some examples, the UE 115-*a* may include more reference signals if M2×N2>>M1×N1. The UE 115-*a* may attempt to find an M3 value and an N3 value such that M3×N3 is close to M1×N1, and may then perform padding to the transport block or may include additional reference signals for any remaining resource elements.

Figure 3:
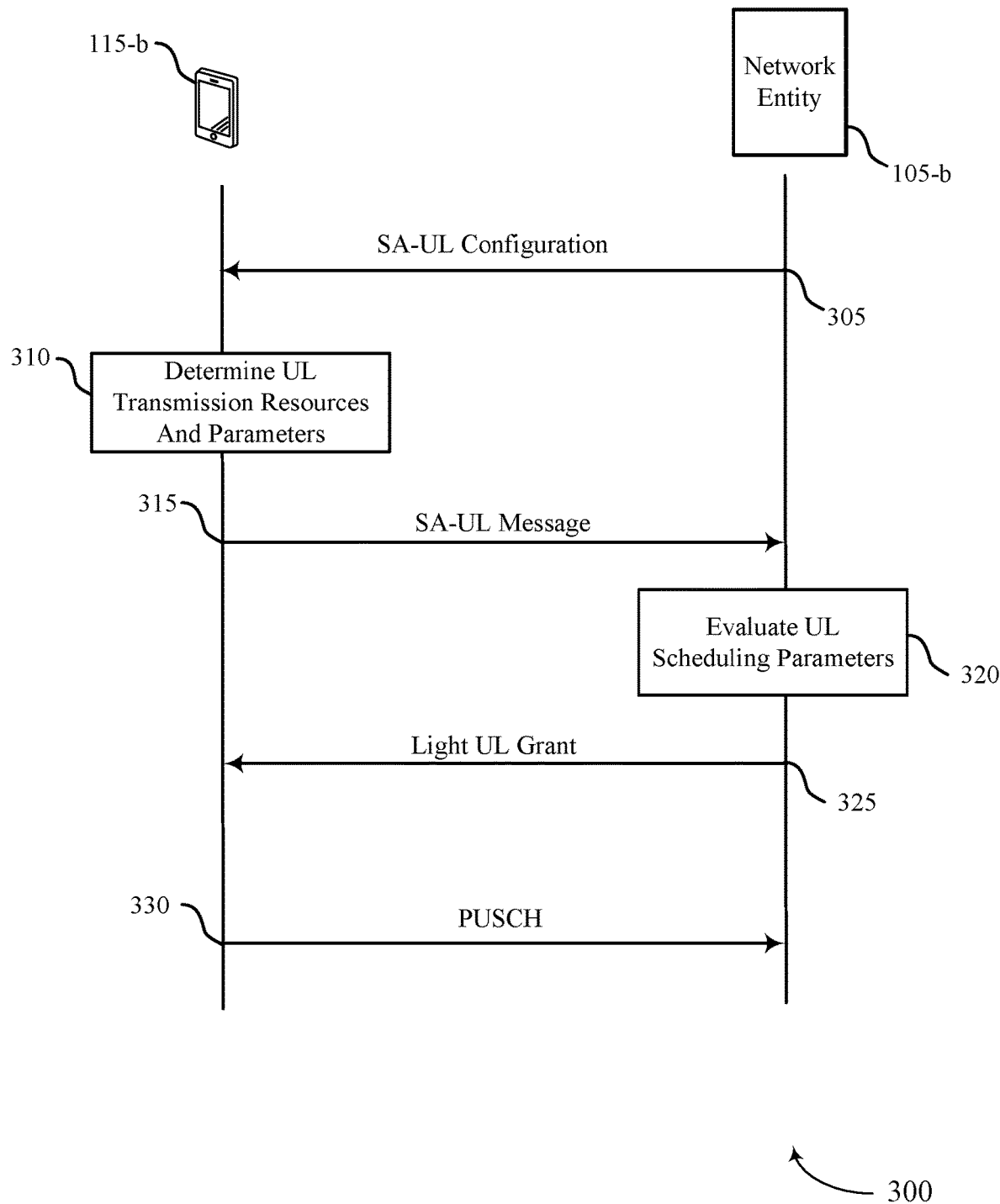
FIG. 3 illustrates an example of a process flow that supports semiautonomous uplink scheduling in accordance with one or more aspects of the present disclosure.

FIG. 3 illustrates an example of a process flow 300 that supports semiautonomous uplink scheduling in accordance with one or more aspects of the present disclosure. In some examples, the process flow 300 may implement aspects of the wireless communications system 100 or 200. The process flow 300 may include a UE 115-*b* and a network entity 105-*b*, which may be examples of corresponding devices as described herein, including with reference to FIG. 1 and FIG. 2.

In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the network entity 105-*b* may transmit a semiautonomous uplink configuration to the UE 115-*b*. For example, the UE 115-*b* may receive control signaling including an indication of time and frequency resources that are configured for semiautonomous uplink scheduling by the UE 115-*b*.

At 310, the UE 115-*b* may determine the uplink transmission resources and parameters based on the semiautonomous uplink configuration and one or more interference measurements. The one or more interference measurements may include at least one of a synchronization signal block measurement, a CSI-RS measurement, or both. In some examples, the UE 115-*b* may determine a set of uplink transmission resources or parameters based on one or more interference measurements performed on the time and frequency resources that are configured for semiautonomous uplink scheduling by the UE 115-*b*.

In some instances, the UE 115-*b* may determine uplink transmission resources and parameters for an uplink PUSCH transmission and may indicate that to the network entity 105-*b* in the form of a semiautonomous uplink message, at 315. The set of uplink transmission resources or parameters may include at least one of a quantity of symbols, a quantity of resource blocks, a quantity of layers, a quantity of demodulation reference signals, a phase tracking reference signal density, a transmit power, an MCS, a HARQ ID based on a CSI and a buffer size, or a combination thereof. For example, the UE 115-*b* may transmit a semiautonomous uplink scheduling message including a request for a set of uplink transmission resources or parameters for an upcoming uplink transmission. In some examples, the UE 115-*b* may determine the uplink transmission resources and parameters based on a buffer size and CSI associated with transmitting an uplink packet (e.g., HARQ-ID, TDRA/FDRA SLIV, MCS, RV-ID, or the like).

At 320, the network entity 105-*b* may evaluate the uplink scheduling parameters and resources indicated in the semiautonomous uplink message. In some cases, the UE 115-*b* may indicate one or more of the parameters to the network entity 105-*b* which may include TDRA, FDRA, MCS, or the like. The network entity 105-*b* may transmit, in response to receiving the semiautonomous uplink scheduling message, a message approving or declining the request (or aspects of the request) for the set of uplink transmission resources or parameters. In some instances, the network entity 105-*b* may approve the UE scheduling parameters and resources for the uplink transmission. In such cases, at 325, the network entity 105-*b* may transmit a light uplink grant indicating the approval (or indicating which aspects of the semiautonomous uplink scheduling message have been approved). The UE 115-*b* may receive the light uplink grant and may transmit an uplink PUSCH transmission in accordance with the light uplink grant (e.g., using one or more of the resources indicated by the light uplink grant). Alternatively, the network entity 105-*b* may decline the scheduling parameters and resources requested by the UE 115-*b* for the uplink transmission. In some examples, the network entity 105-*b* may transmit a light uplink grant indicating the disapproval of uplink transmission resources and parameters requested by the UE 115-*b* (or aspects of the scheduling parameters and resources that have been disapproved). Instead, the network entity 105-*b* may allocate different resources to the UE 115-*b*. In some examples, the network entity 105-*b* may use the techniques described with reference to FIG. 2 to modify the uplink scheduling resources and parameters requested by the UE 115-*b*. In such cases, the UE 115-*b* may receive a modification request to modify the set of uplink transmission resources requested for the upcoming uplink transmission. The UE 115-*b* may receive the light uplink grant and may adjust the PUSCH transmission.

At 330, the UE 115-*b* may send the uplink PUSCH transmission to the network entity 105-*b*. The additional details related to PUSCH preparation and transmission are described with reference to FIG. 4.

Figure 4:
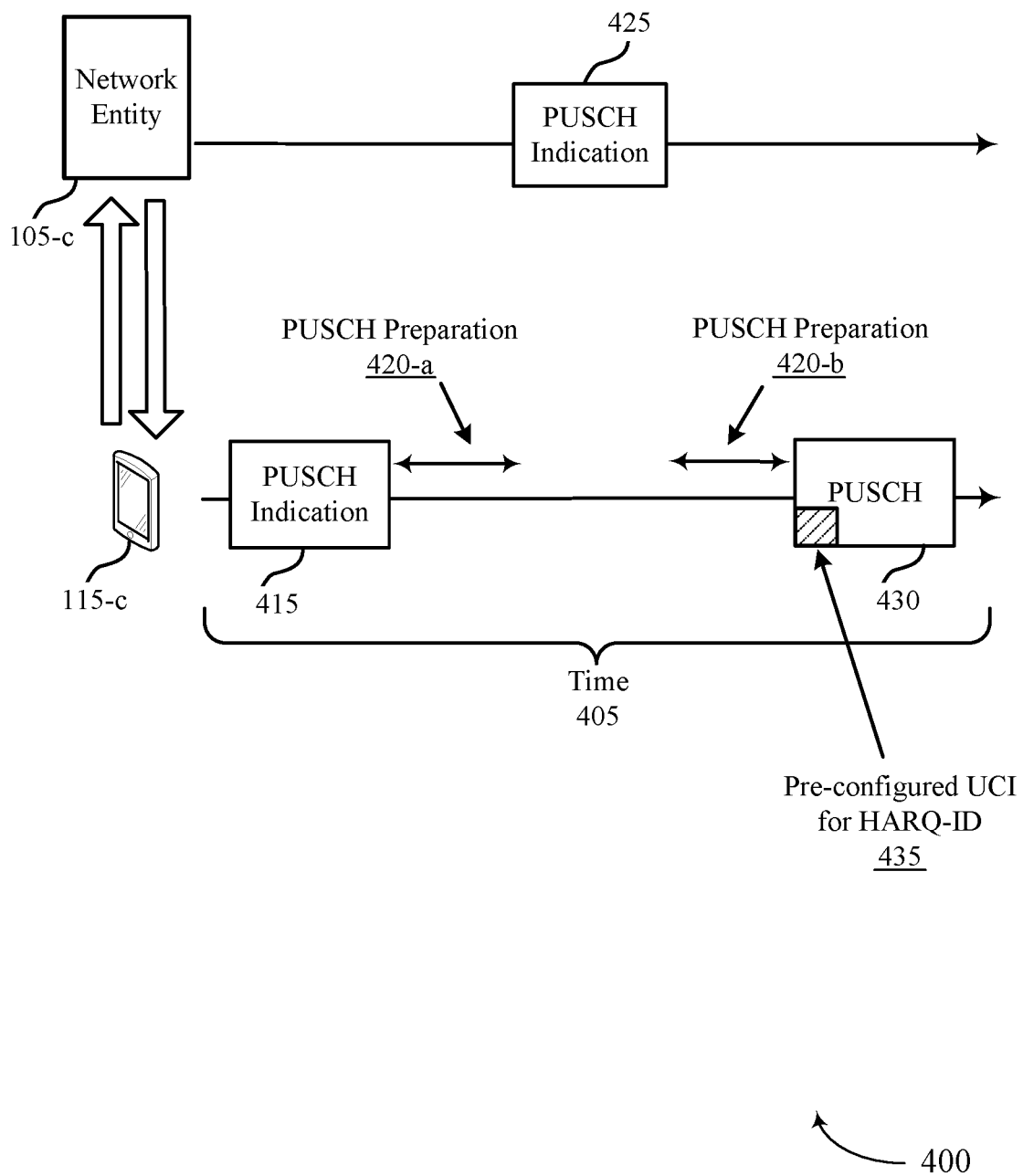
FIG. 4 illustrates an example of a wireless communications process that supports semiautonomous uplink scheduling in accordance with one or more aspects of the present disclosure.

FIG. 4 illustrates an example of a wireless communications process 400 that supports semiautonomous uplink scheduling in accordance with one or more aspects of the present disclosure. The wireless communications process 400 may include a UE 115-*c* and a network entity 105-*c*, which may be examples of corresponding devices as described herein, including with reference to FIG. 1, FIG. 2, and FIG. 3.

In some examples, the network entity 105-*c* may communicate with the UE 115-*a* using uplink and downlink communication channels. The UE 115-*a* may receive control signaling including an indication of time and frequency resources that are configured for semiautonomous uplink scheduling from the UE 115-*a* as described with reference to FIGS. 2 and 3. The UE 115-*a* may initiate a time period 405 for communication.

At 415, the UE 115-*c* may transmit a PUSCH indication where the UE 115-*c* may request uplink parameters and resources to the network entity 105-*c*. For instance, the UE 115-*c* may transmit a semiautonomous uplink scheduling message including a request for a set of uplink transmission resources or parameters for an upcoming uplink transmission. In some examples, the set of uplink transmission resources or parameters may be based on one or more interference measurements performed on the time and frequency resources that are configured for semiautonomous uplink scheduling from the UE 115-*c*.

After receiving PUSCH indication 415, the UE 115-*c* may start PUSCH preparation 420-*a* (e.g., transport block size determination, code block segmentation, cyclic redundancy check computation, scrambling, low density parity check code base graph (LDPC BG) selection, encoding, or the like) after transmitting PUSCH indication at 415. The network entity 105-*c* may transmit a PUSCH indication 425 which may be included in a light PUSCH grant to the UE 115-*c*.

After receiving PUSCH indication 425, the UE 115-*c* may use another PUSCH preparation 420-*b* for a decoding period to the PUSCH scheduling. In some examples, the PUSCH preparation 420-*b* may be based on one or more configuration options indicated by the network entity 105-*c*. As such, a PUSCH 430 may use the decoding period and the PUSCH preparation 420-*b* for the uplink transmission. In some examples, the PUSCH 430 may include a pre-configured uplink control information for HARQ-ID 435, MCS, or the like.

In some examples, the UE 115-*c* may transmit a PUSCH 430 during the time period for PUSCH preparation 420-*b* if the network entity 105-*c* may use the PUSCH indication 425 to approve the PUSCH indication 415. In some cases, during the PUSCH preparation 420-*b*, the UE 115-*c* may drop the PUSCH 430 if the network entity 105-*c* may use the PUSCH indication 425 to decline the PUSCH indication 415 (i.e., if the network entity declines the requested resources and parameters). In some examples, if network entity 105-*c* modifies a PUSCH starting position, then the UE 115-*c* may use the PUSCH preparation 420-*b* to account for orthogonal frequency division multiplexing (OFDM) resource element mapping and inverse fast Fourier transform (IFFT) operations for the PUSCH 430. In some examples, if network entity 105-*c* modifies a PUSCH starting position and bandwidth, then the UE 115-*c* may use the PUSCH preparation 420-*b* to account for rate matching, resource element mapping, or the like for the PUSCH 430. In some examples, the PUSCH resource that arrives first during the time period 405 for communication may initiate a time gap between PUSCH indications (e.g., PUSCH indication 415 or PUSCH indication 425) and the PUSCH 430 greater than the sum of the PUSCH preparation 420-*a*, the decoding period to the PUSCH scheduling, and the PUSCH preparation 420-*b*.

Figure 5:
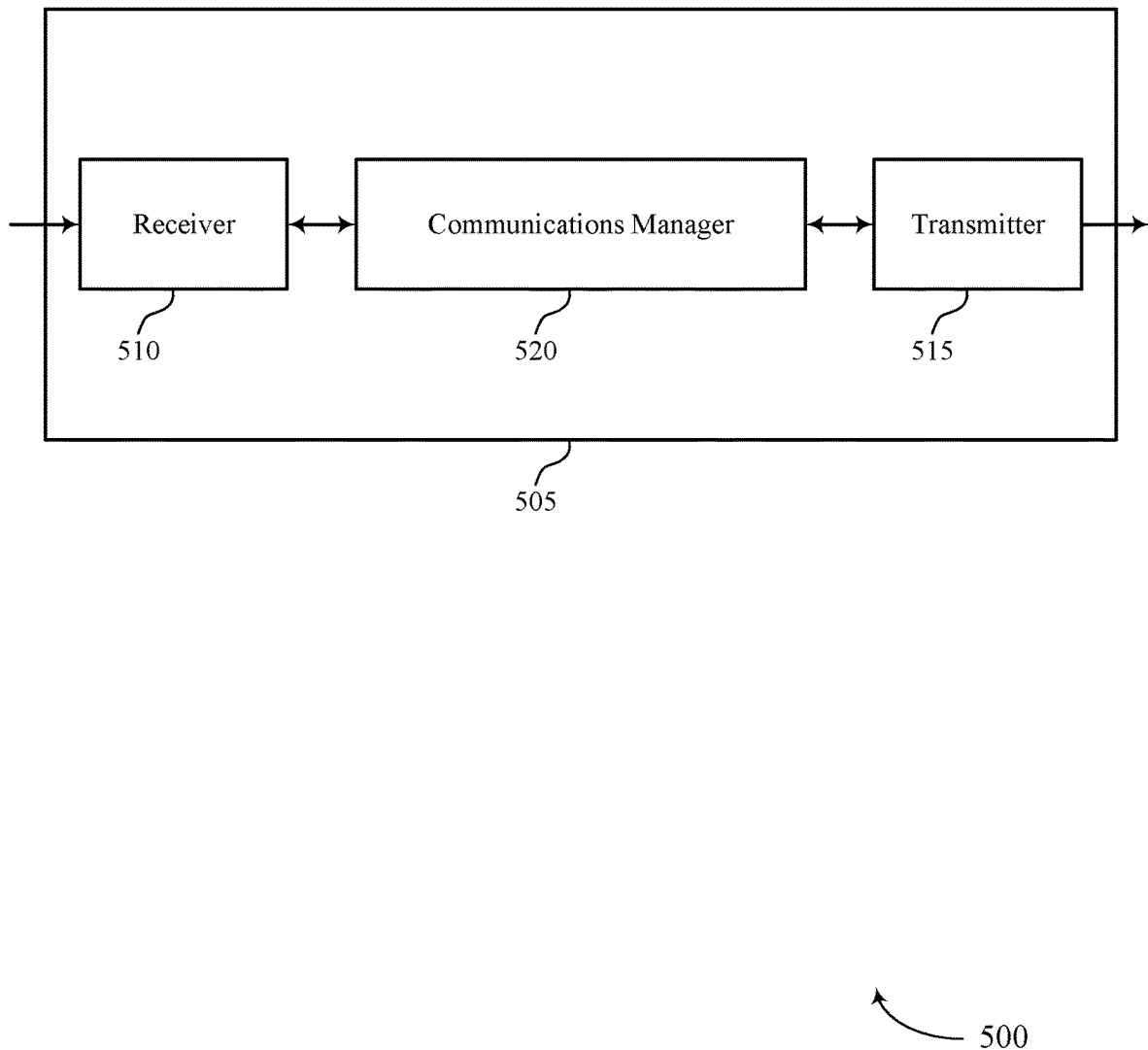
FIGS. 5 and 6 show block diagrams of devices that support semiautonomous uplink scheduling in accordance with one or more aspects of the present disclosure.

FIG. 5 shows a block diagram 500 of a device 505 that supports semiautonomous uplink scheduling in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to semiautonomous uplink scheduling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to semiautonomous uplink scheduling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of semiautonomous uplink scheduling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving control signaling including an indication of time and frequency resources that are configured for semiautonomous uplink scheduling from the UE. The communications manager 520 may be configured as or otherwise support a means for transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The communications manager 520 may be configured as or otherwise support a means for receiving, in response to transmitting the semiautonomous uplink scheduling message, a message approving or declining the request for the set of multiple uplink transmission resources or parameters.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources.

Figure 6:
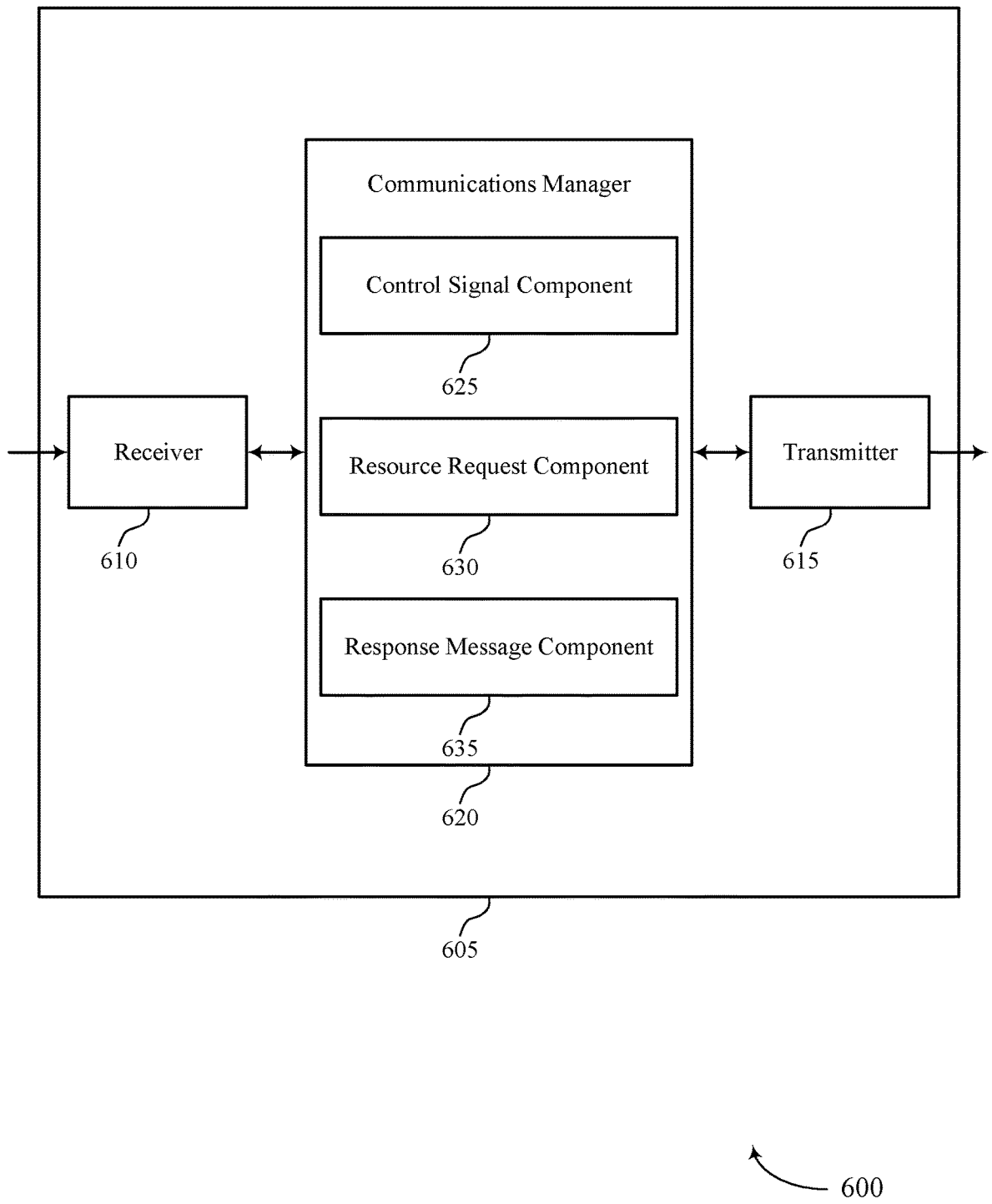

FIG. 6 shows a block diagram 600 of a device 605 that supports semiautonomous uplink scheduling in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to semiautonomous uplink scheduling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to semiautonomous uplink scheduling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of semiautonomous uplink scheduling as described herein. For example, the communications manager 620 may include a control signal component 625, a resource request component 630, a response message component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The control signal component 625 may be configured as or otherwise support a means for receiving control signaling including an indication of time and frequency resources that are configured for semiautonomous uplink scheduling from the UE. The resource request component 630 may be configured as or otherwise support a means for transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The response message component 635 may be configured as or otherwise support a means for receiving, in response to transmitting the semiautonomous uplink scheduling message, a message approving or declining the request for the set of multiple uplink transmission resources or parameters.

Figure 7:
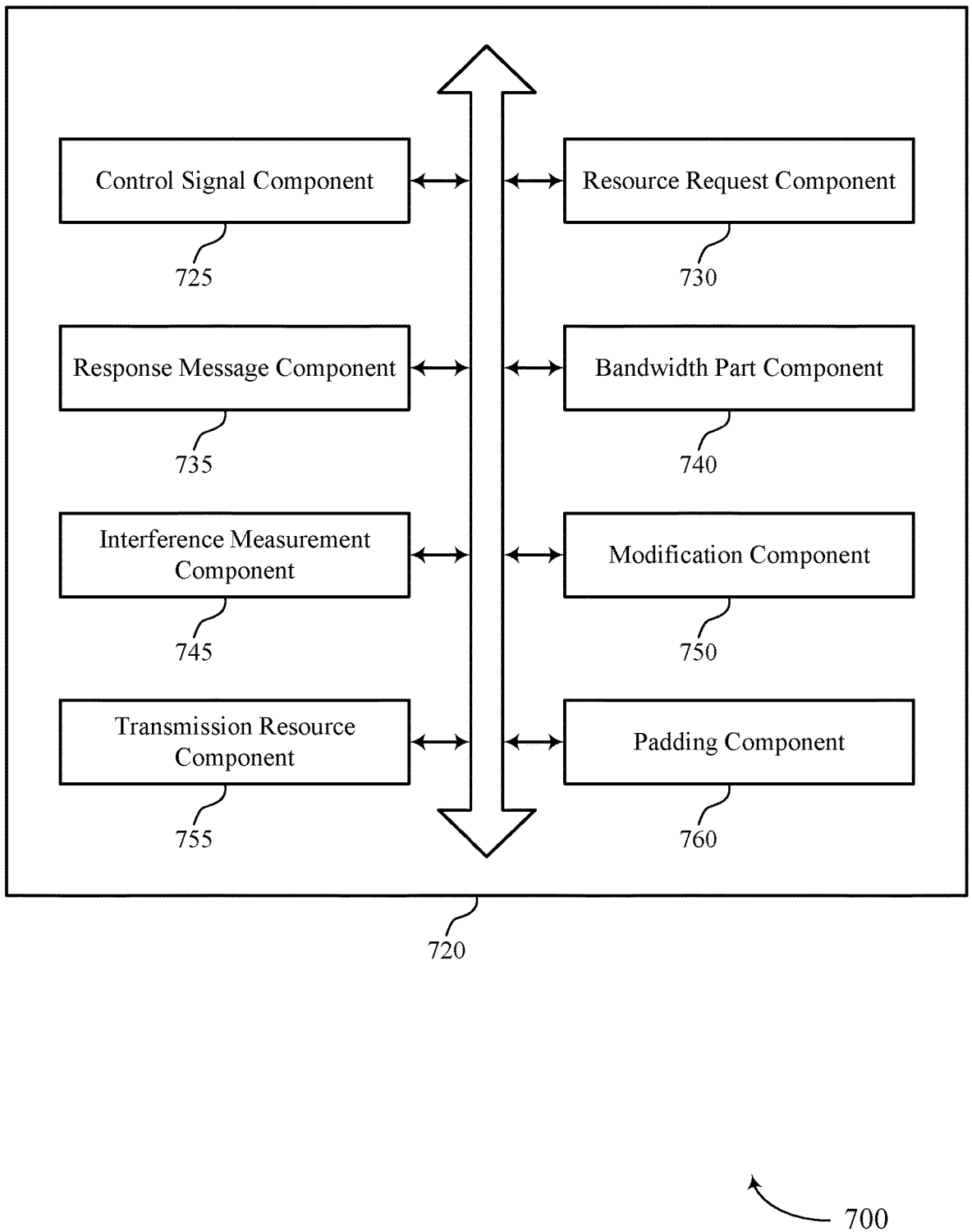
FIG. 7 shows a block diagram of a communications manager that supports semiautonomous uplink scheduling in accordance with one or more aspects of the present disclosure.

FIG. 7 shows a block diagram 700 of a communications manager 720 that supports semiautonomous uplink scheduling in accordance with one or more aspects of the present disclosure. The communications manager 720 may be an example of aspects of a communications manager 520, a communications manager 620, or both, as described herein. The communications manager 720, or various components thereof, may be an example of means for performing various aspects of semiautonomous uplink scheduling as described herein. For example, the communications manager 720 may include a control signal component 725, a resource request component 730, a response message component 735, a bandwidth part component 740, an interference measurement component 745, a modification component 750, a transmission resource component 755, a padding component 760, or any combination thereof. Each of these components may communicate, directly or indirectly, with one another (e.g., via one or more buses).

The communications manager 720 may support wireless communication at a UE in accordance with examples as disclosed herein. The control signal component 725 may be configured as or otherwise support a means for receiving control signaling including an indication of time and frequency resources that are configured for semiautonomous uplink scheduling from the UE. The resource request component 730 may be configured as or otherwise support a means for transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The response message component 735 may be configured as or otherwise support a means for receiving, in response to transmitting the semiautonomous uplink scheduling message, a message approving or declining the request for the set of multiple uplink transmission resources or parameters.

In some examples, to support receiving the control signaling, the control signal component 725 may be configured as or otherwise support a means for receiving an indication of one or more uplink bandwidth parts that are configured for semiautonomous uplink scheduling from the UE.

In some examples, the bandwidth part component 740 may be configured as or otherwise support a means for receiving an indication of a starting positioning with reference to a physical resource block index or a frequency offset to a reference point associated with the one or more uplink bandwidth parts that are configured for semiautonomous uplink scheduling from the UE.

In some examples, the bandwidth part component 740 may be configured as or otherwise support a means for receiving signaling including a request for the UE to switch from a first uplink bandwidth part of the one or more uplink bandwidth parts to a second uplink bandwidth part of the one or more uplink bandwidth parts, where the one or more interference measurements are performed on the second uplink bandwidth part.

In some examples, the indication of the one or more uplink bandwidth parts includes a bitmap indicating an index for the one or more uplink bandwidth parts. In some examples, the index includes at least one of a subframe index, a slot index, a symbol index, or a combination thereof. In some examples, the one or more uplink bandwidth parts correspond to one or more flexible slots.

In some examples, the bandwidth part component 740 may be configured as or otherwise support a means for receiving an indication of a first uplink bandwidth part that is configured for uplink scheduling from a network entity and a second uplink bandwidth part that is configured for semiautonomous uplink scheduling from the UE. In some examples, the bandwidth part component 740 may be configured as or otherwise support a means for receiving signaling including a request for the UE to switch from the first uplink bandwidth part to the second uplink bandwidth part, where the one or more interference measurements are performed on the second uplink bandwidth part.

In some examples, the interference measurement component 745 may be configured as or otherwise support a means for performing the one or more interference measurements on the time and frequency resources that are configured for semiautonomous uplink scheduling from the UE. In some examples, the interference measurement component 745 may be configured as or otherwise support a means for determining the set of multiple uplink transmission resources or parameters based on performing the one or more interference measurements.

In some examples, the modification component 750 may be configured as or otherwise support a means for receiving a modification request to modify the set of multiple uplink transmission resources requested for the upcoming uplink transmission.

In some examples, to support receiving the message approving or declining the request, the response message component 735 may be configured as or otherwise support a means for receiving, via a PDCCH, a set of uplink transmission resources different from the set of multiple uplink transmission resources requested for the upcoming uplink transmission.

In some examples, the transmission resource component 755 may be configured as or otherwise support a means for determining that the set of uplink transmission resources is less than a threshold, or that a transport block segmentation is not permitted, or that a time associated with transport block segmentation is greater than a configured time gap. In some examples, the transmission resource component 755 may be configured as or otherwise support a means for dropping the upcoming uplink transmission based on the determining.

In some examples, the transmission resource component 755 may be configured as or otherwise support a means for determining that the set of uplink transmission resources overlaps with a second uplink transmission having a same or greater priority than the upcoming uplink transmission. In some examples, the transmission resource component 755 may be configured as or otherwise support a means for dropping the upcoming uplink transmission based on the determining.

In some examples, the transmission resource component 755 may be configured as or otherwise support a means for dropping the upcoming uplink transmission based on determining that the set of uplink transmission resources exceeds a packet latency bound.

In some examples, the padding component 760 may be configured as or otherwise support a means for padding a transport block in the upcoming uplink transmission based on determining that the set of uplink transmission resources is greater than the set of multiple uplink transmission resources requested for the upcoming uplink transmission.

In some examples, the transmission resource component 755 may be configured as or otherwise support a means for determining that the set of uplink transmission resources is greater than the set of multiple uplink transmission resources requested for the upcoming uplink transmission. In some examples, the transmission resource component 755 may be configured as or otherwise support a means for performing a rate-matching to the set of uplink transmission resources with one or more bits using a circular buffer.

In some examples, the set of multiple uplink transmission resources or parameters include at least one of a quantity of symbols, a quantity of resource blocks, a quantity of layers, a quantity of demodulation reference signals, a phase tracking reference signal density, a transmit power, an MCS, a HARQ ID based on a CSI and a buffer size, or a combination thereof. In some examples, the one or more interference measurements include at least one of a synchronization signal block measurement, a CSI-RS measurement, or both.

Figure 8:
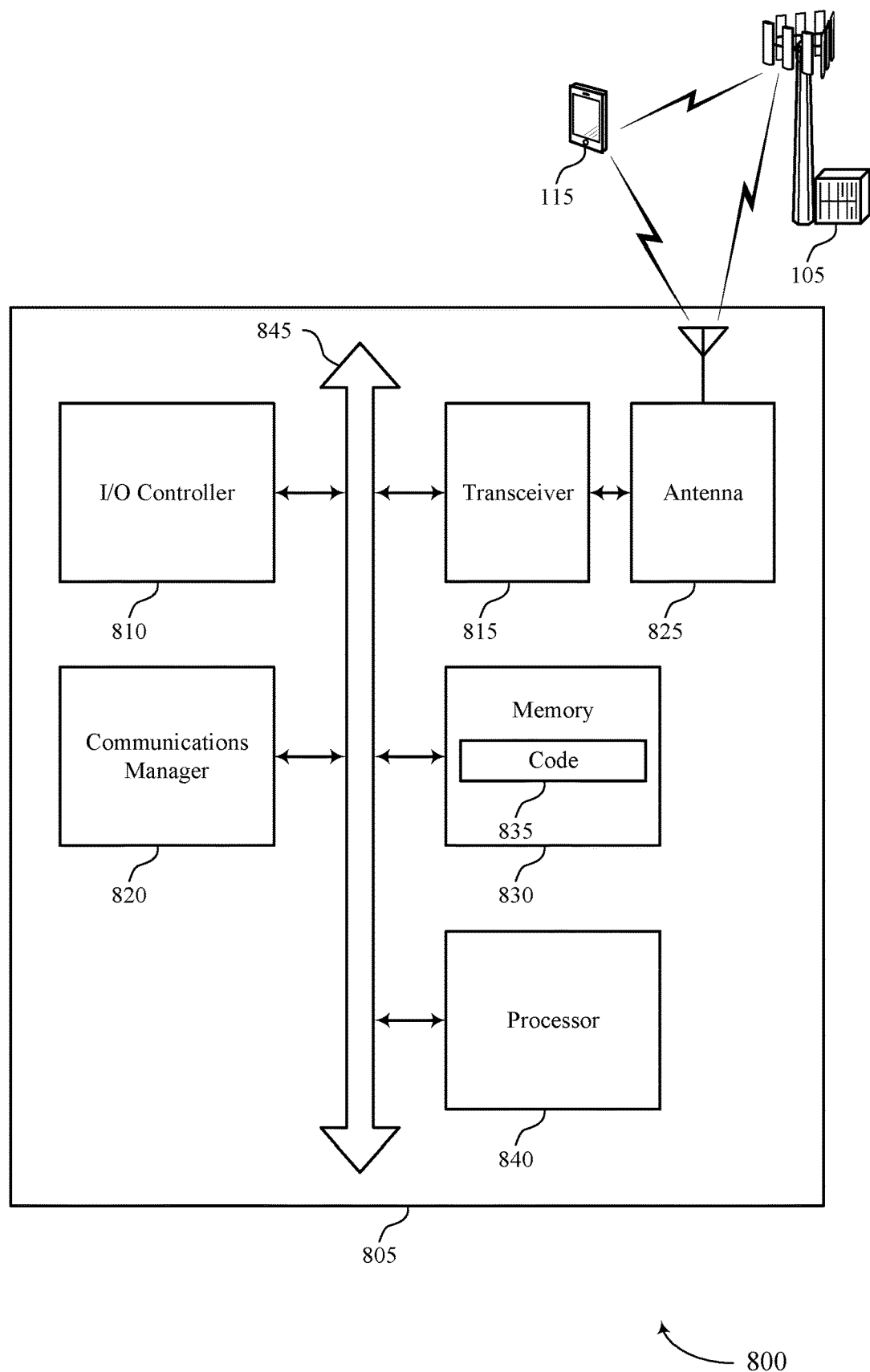
FIG. 8 shows a diagram of a system including a device that supports semiautonomous uplink scheduling in accordance with one or more aspects of the present disclosure.

FIG. 8 shows a diagram of a system 800 including a device 805 that supports semiautonomous uplink scheduling in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting semiautonomous uplink scheduling). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling including an indication of time and frequency resources that are configured for semiautonomous uplink scheduling from the UE. The communications manager 820 may be configured as or otherwise support a means for transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The communications manager 820 may be configured as or otherwise support a means for receiving, in response to transmitting the semiautonomous uplink scheduling message, a message approving or declining the request for the set of multiple uplink transmission resources or parameters.

By including or configuring the communications manager 820 in accordance with examples as described herein, the device 805 may support techniques for improved communication reliability, reduced latency, reduced power consumption, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of semiautonomous uplink scheduling as described herein, or the processor 840 and the memory 830 may be otherwise configured to perform or support such operations.

Figure 9:
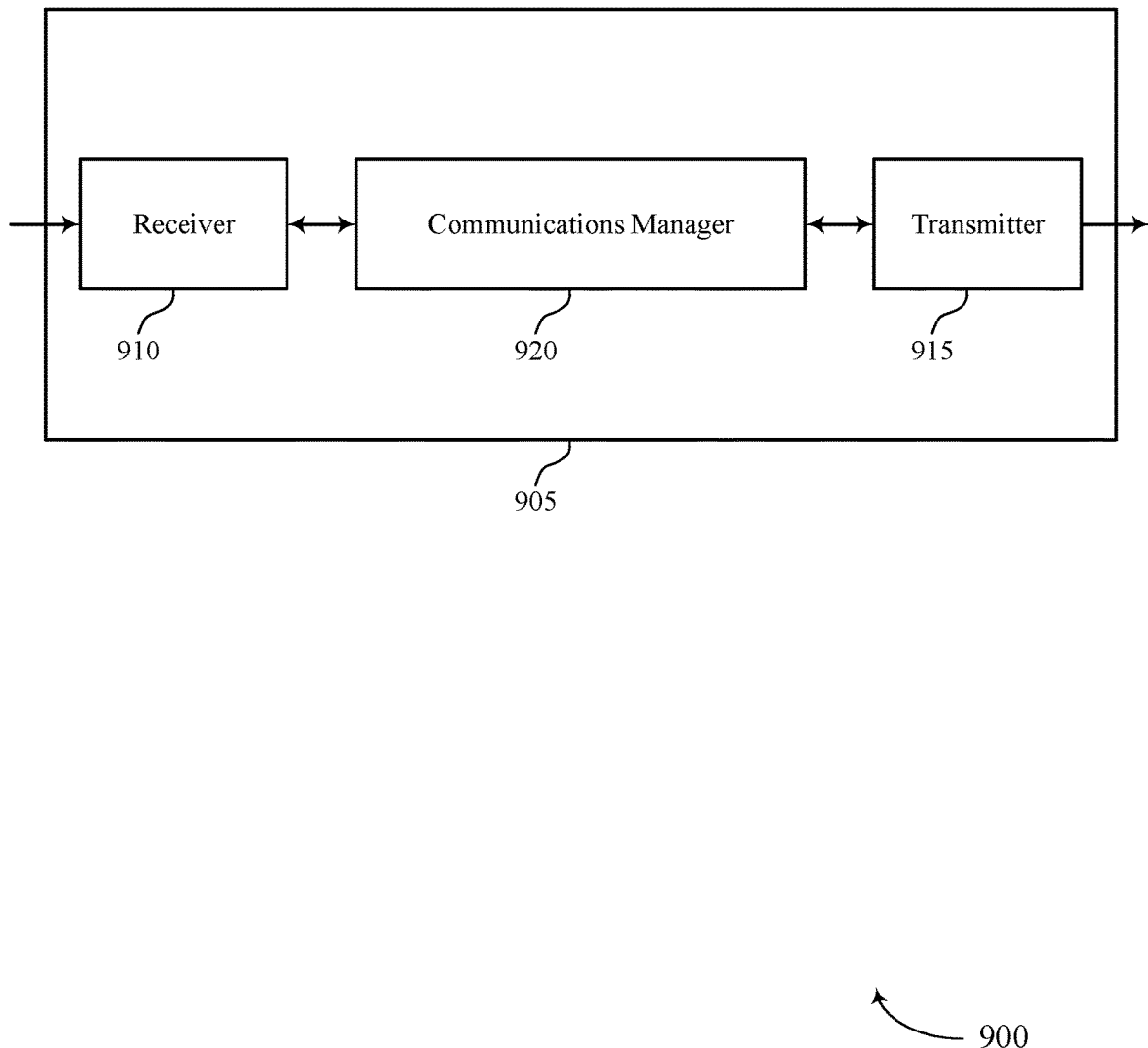
FIGS. 9 and 10 show block diagrams of devices that support semiautonomous uplink scheduling in accordance with one or more aspects of the present disclosure.

FIG. 9 shows a block diagram 900 of a device 905 that supports semiautonomous uplink scheduling in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of semiautonomous uplink scheduling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, control signaling including an indication of time and frequency resources that are configured for semiautonomous uplink scheduling from the UE. The communications manager 920 may be configured as or otherwise support a means for receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The communications manager 920 may be configured as or otherwise support a means for transmitting, to the UE and in response to transmitting the semiautonomous uplink scheduling message, a message approving or declining the request for the set of multiple uplink transmission resources or parameters.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
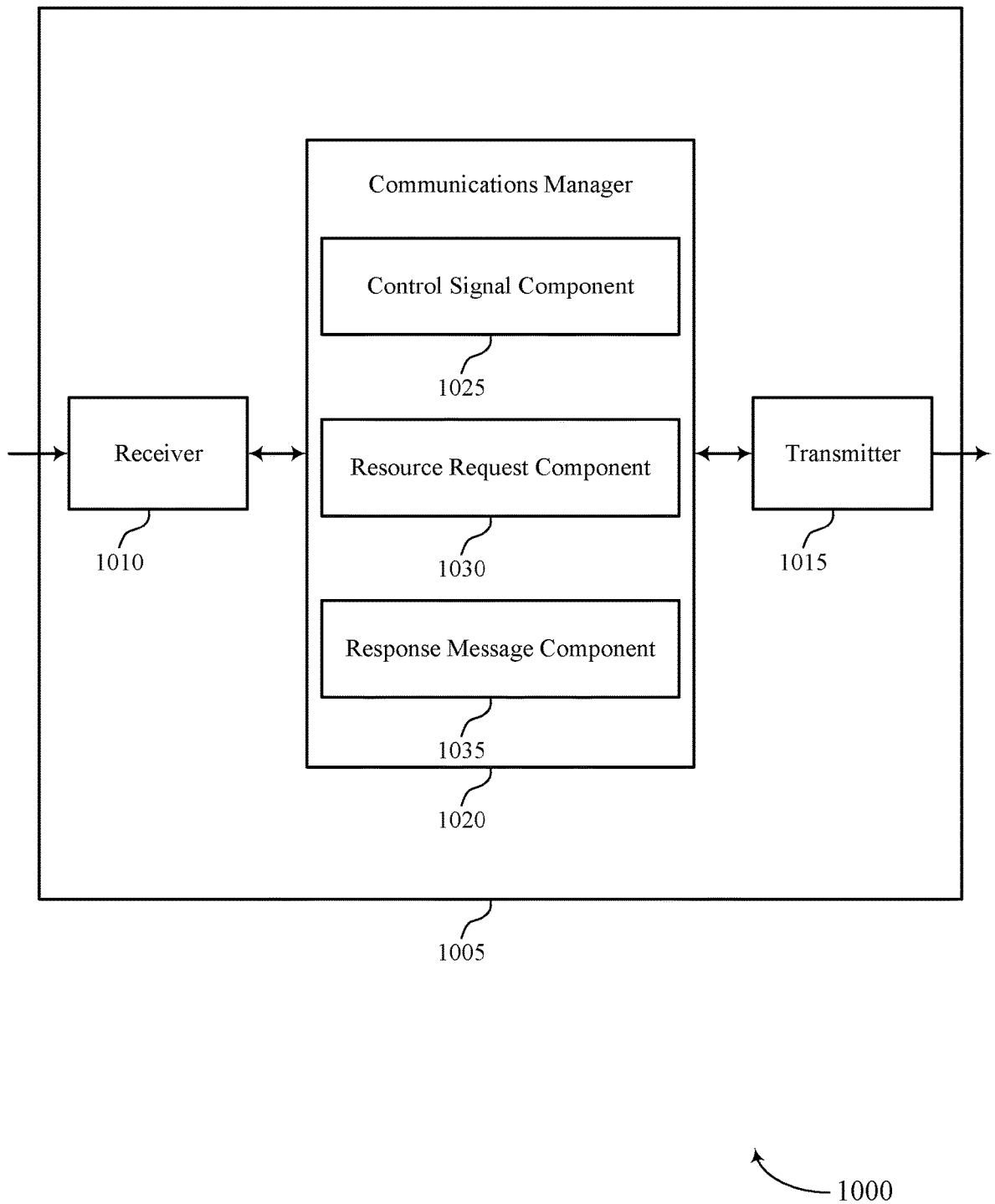

FIG. 10 shows a block diagram 1000 of a device 1005 that supports semiautonomous uplink scheduling in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of semiautonomous uplink scheduling as described herein. For example, the communications manager 1020 may include a control signal component 1025, a resource request component 1030, a response message component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The control signal component 1025 may be configured as or otherwise support a means for transmitting, to a UE, control signaling including an indication of time and frequency resources that are configured for semiautonomous uplink scheduling from the UE. The resource request component 1030 may be configured as or otherwise support a means for receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The response message component 1035 may be configured as or otherwise support a means for transmitting, to the UE and in response to transmitting the semiautonomous uplink scheduling message, a message approving or declining the request for the set of multiple uplink transmission resources or parameters.

Figure 11:
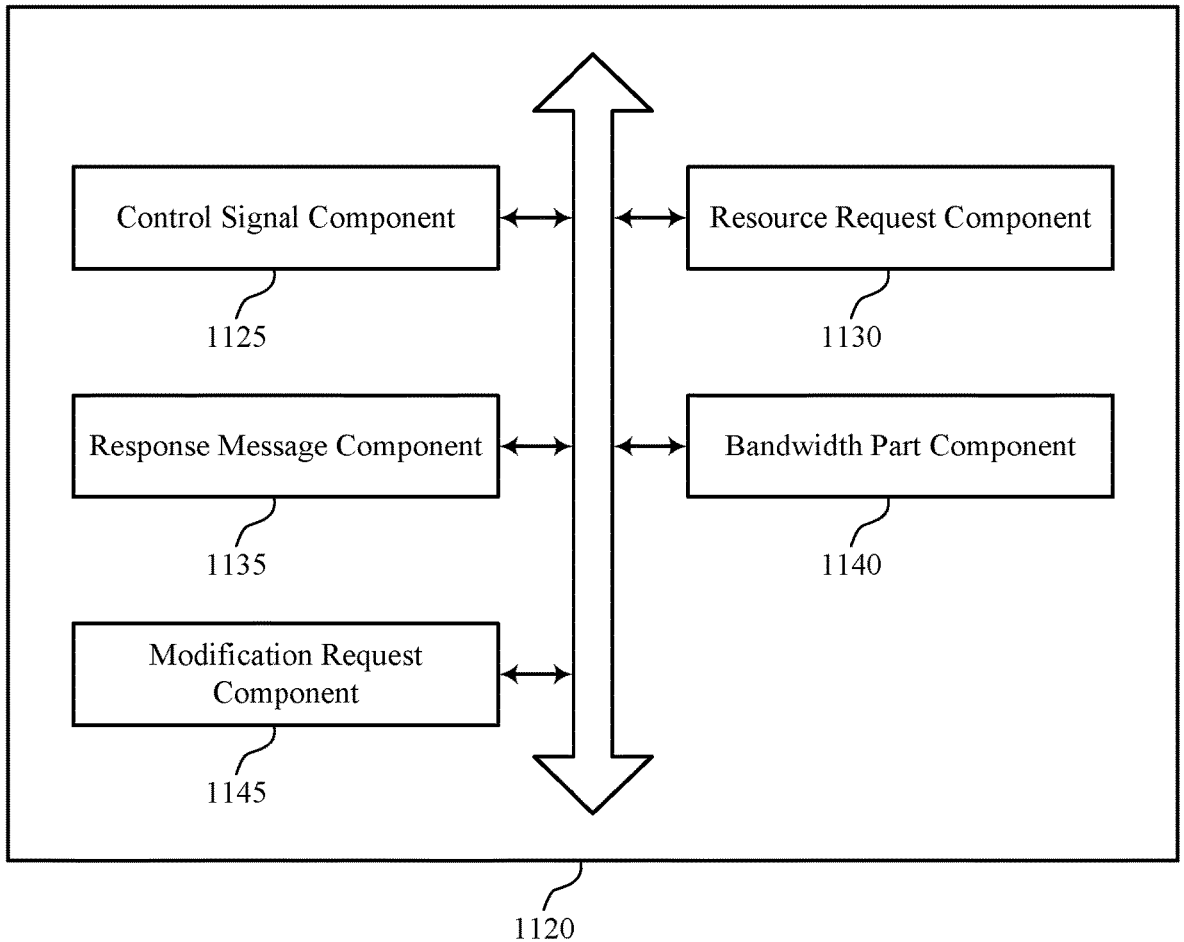
FIG. 11 shows a block diagram of a communications manager that supports semiautonomous uplink scheduling in accordance with one or more aspects of the present disclosure.

FIG. 11 shows a block diagram 1100 of a communications manager 1120 that supports semiautonomous uplink scheduling in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of semiautonomous uplink scheduling as described herein. For example, the communications manager 1120 may include a control signal component 1125, a resource request component 1130, a response message component 1135, a bandwidth part component 1140, a modification request component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The control signal component 1125 may be configured as or otherwise support a means for transmitting, to a UE, control signaling including an indication of time and frequency resources that are configured for semiautonomous uplink scheduling from the UE. The resource request component 1130 may be configured as or otherwise support a means for receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The response message component 1135 may be configured as or otherwise support a means for transmitting, to the UE and in response to transmitting the semiautonomous uplink scheduling message, a message approving or declining the request for the set of multiple uplink transmission resources or parameters.

In some examples, to support transmitting the control signaling, the bandwidth part component 1140 may be configured as or otherwise support a means for transmitting, to the UE, an indication of one or more uplink bandwidth parts that are configured for semiautonomous uplink scheduling from the UE.

In some examples, the response message component 1135 may be configured as or otherwise support a means for transmitting, to the UE, an indication of a starting positioning with reference to a physical resource block index or a frequency offset to a reference point associated with the one or more uplink bandwidth parts that are configured for semiautonomous uplink scheduling from the UE.

In some examples, the response message component 1135 may be configured as or otherwise support a means for transmitting, to the UE, signaling including a request for the UE to switch from a first uplink bandwidth part of the one or more uplink bandwidth parts to a second uplink bandwidth part of the one or more uplink bandwidth parts, where the one or more interference measurements are performed on the second uplink bandwidth part.

In some examples, the indication of the one or more uplink bandwidth parts includes a bitmap indicating an index for the one or more uplink bandwidth parts. In some examples, the index includes at least one of a subframe index, a slot index, a symbol index, or a combination thereof. In some examples, the one or more uplink bandwidth parts correspond to one or more flexible slots.

In some examples, the bandwidth part component 1140 may be configured as or otherwise support a means for transmitting, to the UE, an indication of a first uplink bandwidth part that is configured for uplink scheduling from the network entity and a second uplink bandwidth part that is configured for semiautonomous uplink scheduling from the UE. In some examples, the bandwidth part component 1140 may be configured as or otherwise support a means for transmitting, to the UE, signaling including a request for the UE to switch from the first uplink bandwidth part to the second uplink bandwidth part, where the one or more interference measurements are performed on the second uplink bandwidth part.

In some examples, the modification request component 1145 may be configured as or otherwise support a means for transmitting, to the UE, a modification request to modify the set of multiple uplink transmission resources requested for the upcoming uplink transmission.

In some examples, to support transmitting the message approving or declining the request, the response message component 1135 may be configured as or otherwise support a means for transmitting, to the UE and via a PDCCH, a set of uplink transmission resources different from the set of multiple uplink transmission resources requested for the upcoming uplink transmission.

In some examples, the set of multiple uplink transmission resources or parameters include at least one of a quantity of symbols, a quantity of resource blocks, a quantity of layers, a quantity of demodulation reference signals, a phase tracking reference signal density, a transmit power, an MCS, a HARQ ID based on a CSI and a buffer size, or a combination thereof. In some examples, the one or more interference measurements include at least one of a synchronization signal block measurement, a CSI-RS measurement, or both.

Figure 12:
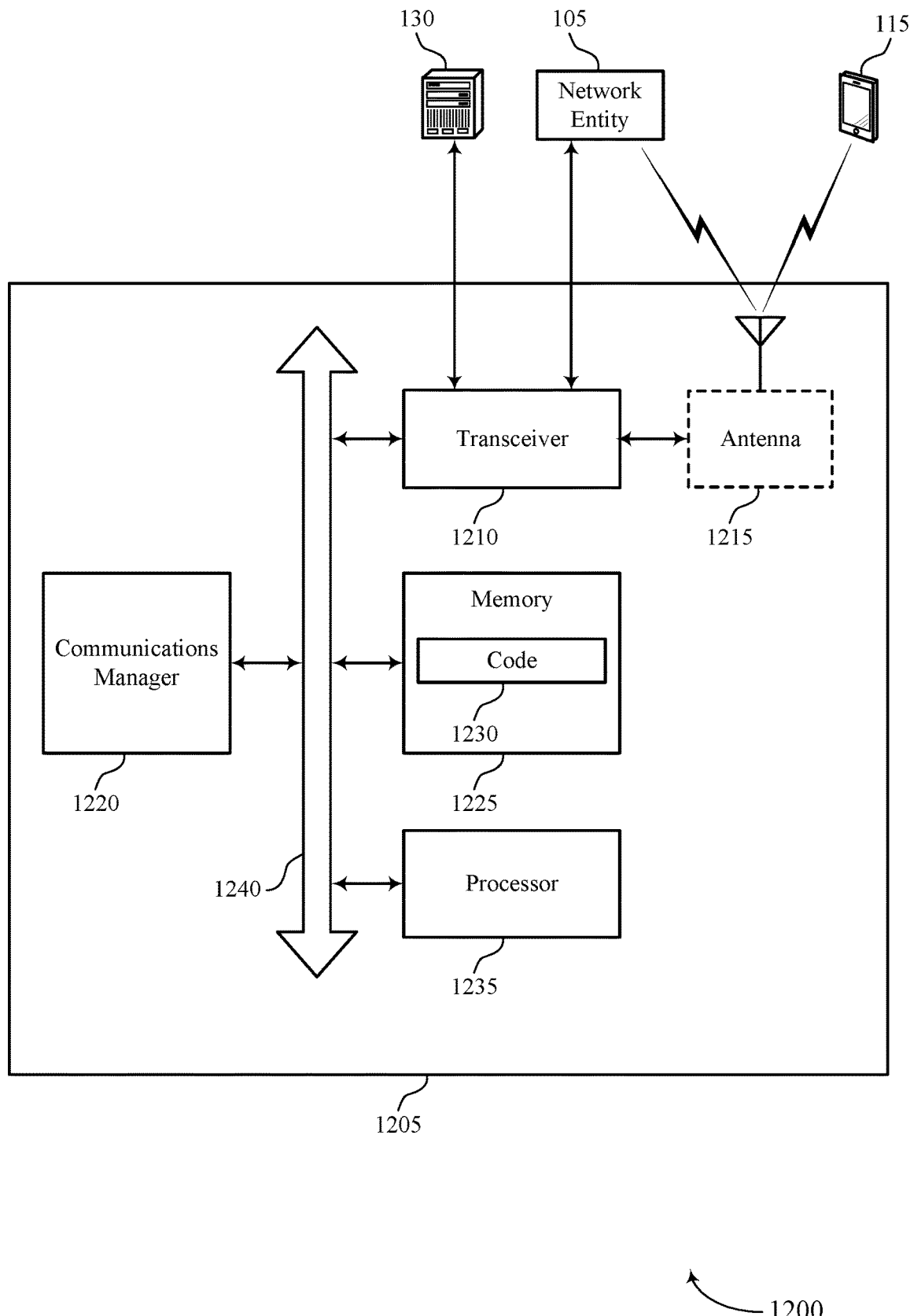
FIG. 12 shows a diagram of a system including a device that supports semiautonomous uplink scheduling in accordance with one or more aspects of the present disclosure.

FIG. 12 shows a diagram of a system 1200 including a device 1205 that supports semiautonomous uplink scheduling in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting semiautonomous uplink scheduling). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, control signaling including an indication of time and frequency resources that are configured for semiautonomous uplink scheduling from the UE. The communications manager 1220 may be configured as or otherwise support a means for receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The communications manager 1220 may be configured as or otherwise support a means for transmitting, to the UE and in response to transmitting the semiautonomous uplink scheduling message, a message approving or declining the request for the set of multiple uplink transmission resources or parameters.

By including or configuring the communications manager 1220 in accordance with examples as described herein, the device 1205 may support techniques for improved communication reliability, reduced latency, reduced power consumption, and more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of semiautonomous uplink scheduling as described herein, or the processor 1235 and the memory 1225 may be otherwise configured to perform or support such operations.

Figure 13:
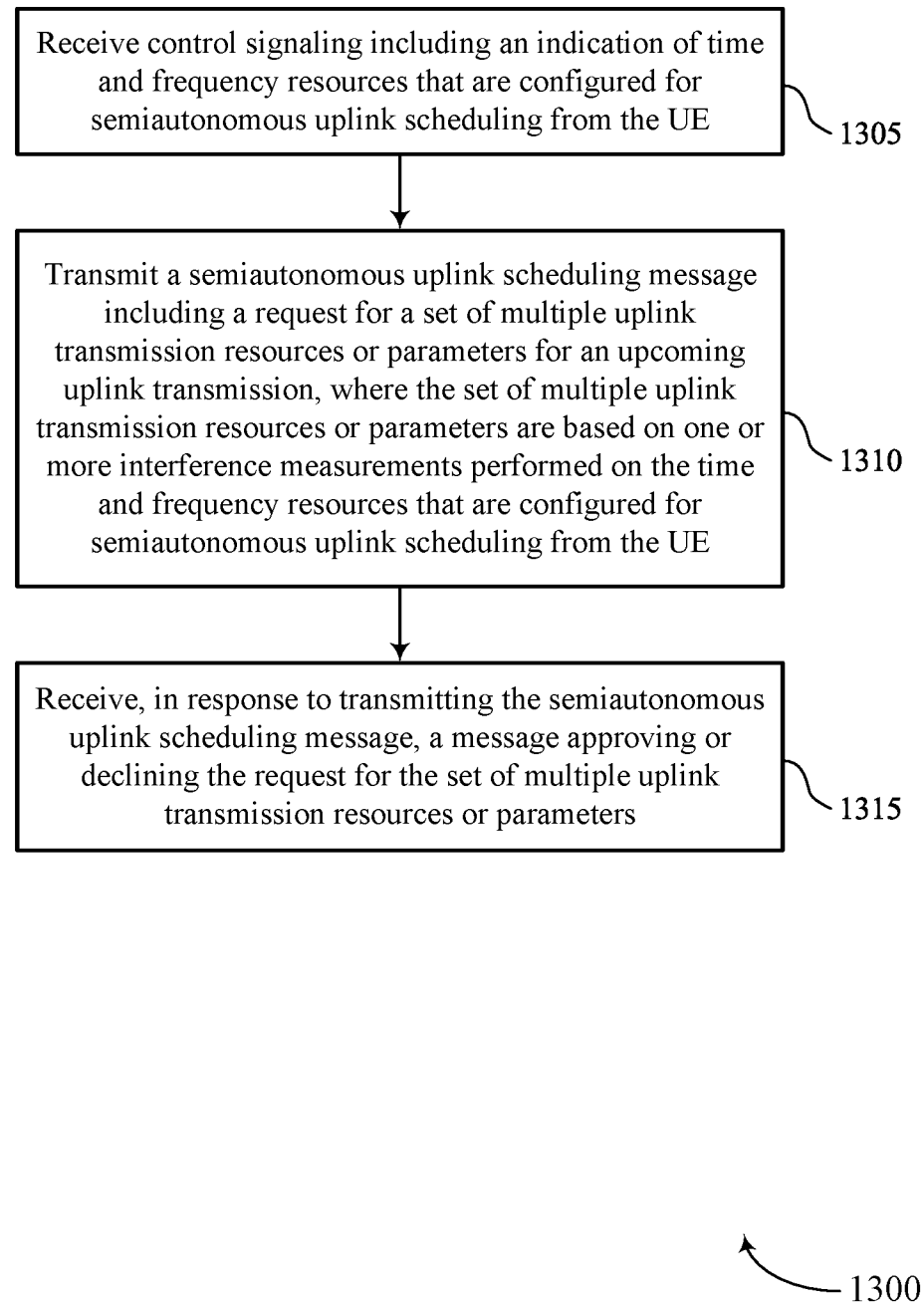
FIGS. 13 through 16 show flowcharts illustrating methods that support semiautonomous uplink scheduling in accordance with one or more aspects of the present disclosure.

FIG. 13 shows a flowchart illustrating a method 1300 that supports semiautonomous uplink scheduling in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling including an indication of time and frequency resources that are configured for semiautonomous uplink scheduling from the UE. The operations of 1305 may be performed in accordance with examples as disclosed herein. In some examples, aspects of the operations of 1305 may be performed by a control signal component 725 as described with reference to FIG. 7.

At 1310, the method may include transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The operations of 1310 may be performed in accordance with examples as disclosed herein. In some examples, aspects of the operations of 1310 may be performed by a resource request component 730 as described with reference to FIG. 7.

At 1315, the method may include receiving, in response to transmitting the semiautonomous uplink scheduling message, a message approving or declining the request for the set of multiple uplink transmission resources or parameters. The operations of 1315 may be performed in accordance with examples as disclosed herein. In some examples, aspects of the operations of 1315 may be performed by a response message component 735 as described with reference to FIG. 7.

Figure 14:
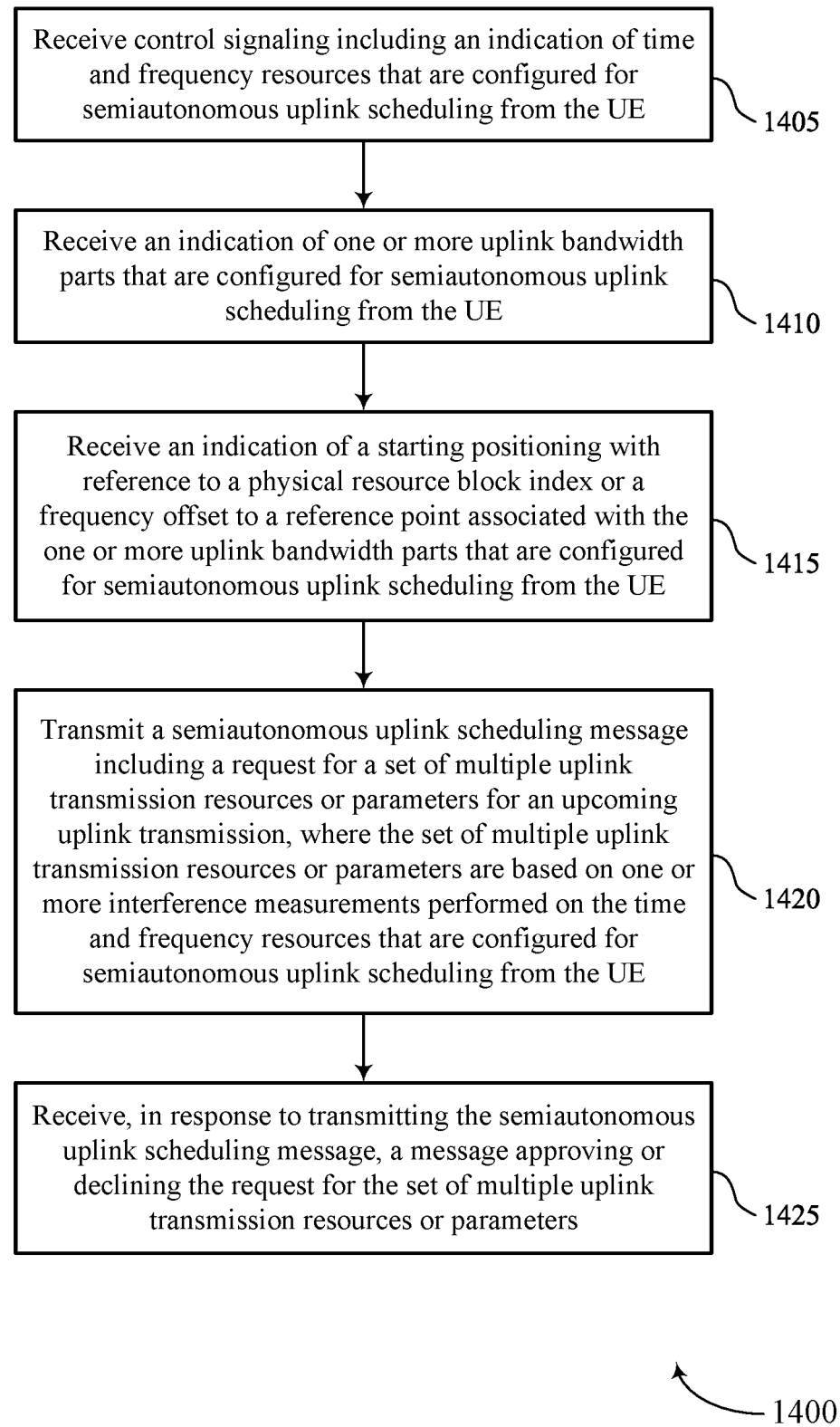

FIG. 14 shows a flowchart illustrating a method 1400 that supports semiautonomous uplink scheduling in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling including an indication of time and frequency resources that are configured for semiautonomous uplink scheduling from the UE. The operations of 1405 may be performed in accordance with examples as disclosed herein. In some examples, aspects of the operations of 1405 may be performed by a control signal component 725 as described with reference to FIG. 7.

At 1410, the method may include receiving an indication of one or more uplink bandwidth parts that are configured for semiautonomous uplink scheduling from the UE. The operations of 1410 may be performed in accordance with examples as disclosed herein. In some examples, aspects of the operations of 1410 may be performed by a control signal component 725 as described with reference to FIG. 7.

At 1415, the method may include receiving an indication of a starting positioning with reference to a physical resource block index or a frequency offset to a reference point associated with the one or more uplink bandwidth parts that are configured for semiautonomous uplink scheduling from the UE. The operations of 1415 may be performed in accordance with examples as disclosed herein. In some examples, aspects of the operations of 1415 may be performed by a bandwidth part component 740 as described with reference to FIG. 7.

At 1420, the method may include transmitting a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The operations of 1420 may be performed in accordance with examples as disclosed herein. In some examples, aspects of the operations of 1420 may be performed by a resource request component 730 as described with reference to FIG. 7.

At 1425, the method may include receiving, in response to transmitting the semiautonomous uplink scheduling message, a message approving or declining the request for the set of multiple uplink transmission resources or parameters. The operations of 1425 may be performed in accordance with examples as disclosed herein. In some examples, aspects of the operations of 1425 may be performed by a response message component 735 as described with reference to FIG. 7.

Figure 15:
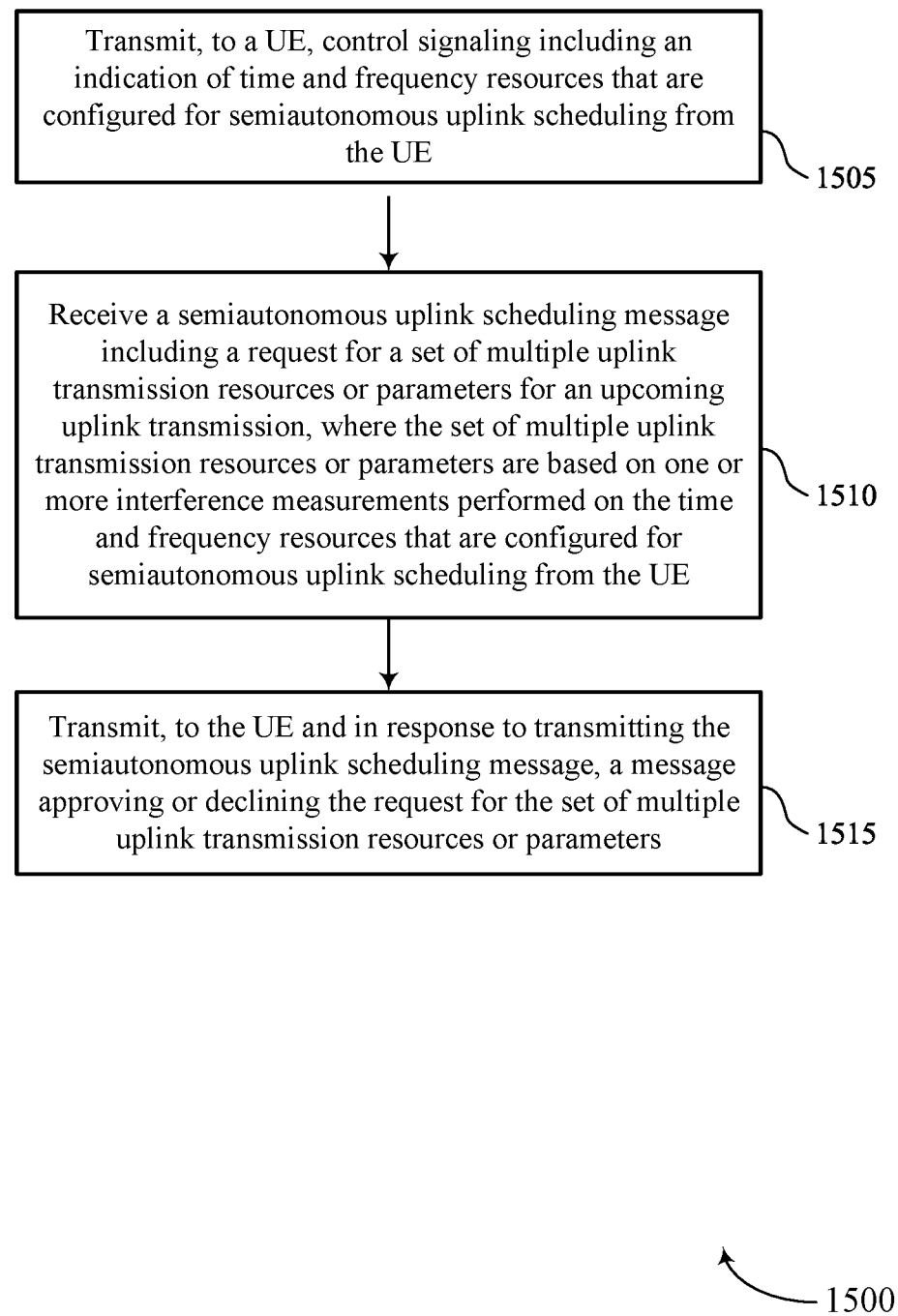

FIG. 15 shows a flowchart illustrating a method 1500 that supports semiautonomous uplink scheduling in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, control signaling including an indication of time and frequency resources that are configured for semiautonomous uplink scheduling from the UE. The operations of 1505 may be performed in accordance with examples as disclosed herein. In some examples, aspects of the operations of 1505 may be performed by a control signal component 1125 as described with reference to FIG. 11.

At 1510, the method may include receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The operations of 1510 may be performed in accordance with examples as disclosed herein. In some examples, aspects of the operations of 1510 may be performed by a resource request component 1130 as described with reference to FIG. 11.

At 1515, the method may include transmitting, to the UE and in response to transmitting the semiautonomous uplink scheduling message, a message approving or declining the request for the set of multiple uplink transmission resources or parameters. The operations of 1515 may be performed in accordance with examples as disclosed herein. In some examples, aspects of the operations of 1515 may be performed by a response message component 1135 as described with reference to FIG. 11.

Figure 16:
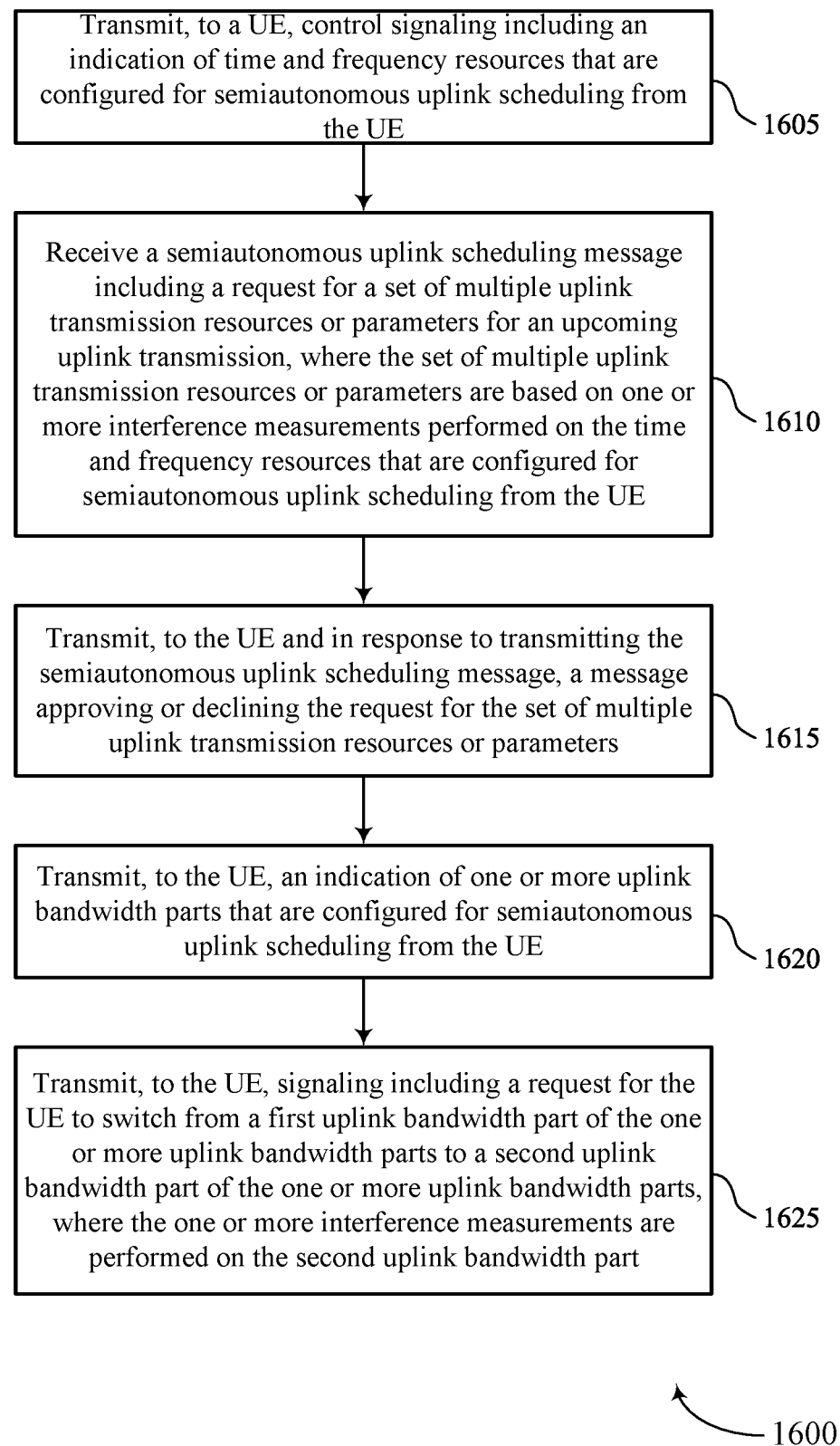

FIG. 16 shows a flowchart illustrating a method 1600 that supports semiautonomous uplink scheduling in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, control signaling including an indication of time and frequency resources that are configured for semiautonomous uplink scheduling from the UE. The operations of 1605 may be performed in accordance with examples as disclosed herein. In some examples, aspects of the operations of 1605 may be performed by a control signal component 1125 as described with reference to FIG. 11.

At 1610, the method may include receiving a semiautonomous uplink scheduling message including a request for a set of multiple uplink transmission resources or parameters for an upcoming uplink transmission, where the set of multiple uplink transmission resources or parameters are based on one or more interference measurements performed on the time and frequency resources that are configured for semiautonomous uplink scheduling from the UE. The operations of 1610 may be performed in accordance with examples as disclosed herein. In some examples, aspects of the operations of 1610 may be performed by a resource request component 1130 as described with reference to FIG. 11.

At 1615, the method may include transmitting, to the UE and in response to transmitting the semiautonomous uplink scheduling message, a message approving or declining the request for the set of multiple uplink transmission resources or parameters. The operations of 1615 may be performed in accordance with examples as disclosed herein. In some examples, aspects of the operations of 1615 may be performed by a response message component 1135 as described with reference to FIG. 11.

At 1620, the method may include transmitting, to the UE, an indication of one or more uplink bandwidth parts that are configured for semiautonomous uplink scheduling from the UE. The operations of 1620 may be performed in accordance with examples as disclosed herein. In some examples, aspects of the operations of 1620 may be performed by a bandwidth part component 1140 as described with reference to FIG. 11.

At 1625, the method may include transmitting, to the UE, signaling including a request for the UE to switch from a first uplink bandwidth part of the one or more uplink bandwidth parts to a second uplink bandwidth part of the one or more uplink bandwidth parts, where the one or more interference measurements are performed on the second uplink bandwidth part. The operations of 1625 may be performed in accordance with examples as disclosed herein. In some examples, aspects of the operations of 1625 may be performed by a response message component 1135 as described with reference to FIG. 11.

The following provides an overview of aspects of the present disclosure:

Aspect 1: A method for wireless communication at a UE, comprising: receiving control signaling comprising an indication of time and frequency resources that are configured for semiautonomous uplink scheduling from the UE; transmitting a semiautonomous uplink scheduling message comprising a request for a plurality of uplink transmission resources or parameters for an upcoming uplink transmission, wherein the plurality of uplink transmission resources or parameters are based at least in part on one or more interference measurements performed on the time and frequency resources that are configured for semiautonomous uplink scheduling from the UE; and receiving, in response to transmitting the semiautonomous uplink scheduling message, a message approving or declining the request for the plurality of uplink transmission resources or parameters.

Aspect 2: The method of aspect 1 or 2, wherein receiving the control signaling comprises: receiving an indication of one or more uplink bandwidth parts that are configured for semiautonomous uplink scheduling from the UE.

Aspect 3: The method of aspect 2, further comprising: receiving an indication of a starting positioning with reference to a physical resource block index or a frequency offset to a reference point associated with the one or more uplink bandwidth parts that are configured for semiautonomous uplink scheduling from the UE.

Aspect 4: The method of any of aspects 2 through 3, further comprising: receiving signaling comprising a request for the UE to switch from a first uplink bandwidth part of the one or more uplink bandwidth parts to a second uplink bandwidth part of the one or more uplink bandwidth parts, wherein the one or more interference measurements are performed on the second uplink bandwidth part.

Aspect 5: The method of any of aspects 2 through 4, wherein the indication of the one or more uplink bandwidth parts comprises a bitmap indicating an index for the one or more uplink bandwidth parts, the index comprises at least one of a subframe index, a slot index, a symbol index, or a combination thereof.

Aspect 6: The method of any of aspects 2 through 5, wherein the one or more uplink bandwidth parts correspond to one or more flexible slots.

Aspect 7: The method of any of aspects 1 through 6, further comprising: receiving an indication of a first uplink bandwidth part that is configured for uplink scheduling from a network entity and a second uplink bandwidth part that is configured for semiautonomous uplink scheduling from the UE; and receiving signaling comprising a request for the UE to switch from the first uplink bandwidth part to the second uplink bandwidth part, wherein the one or more interference measurements are performed on the second uplink bandwidth part.

Aspect 8: The method of any of aspects 1 through 7, further comprising: performing the one or more interference measurements on the time and frequency resources that are configured for semiautonomous uplink scheduling from the UE; and determining the plurality of uplink transmission resources or parameters based at least in part on performing the one or more interference measurements.

Aspect 9: The method of any of aspects 1 through 8, further comprising: receiving a modification request to modify the plurality of uplink transmission resources requested for the upcoming uplink transmission.

Aspect 10: The method of any of aspects 1 through 9, wherein receiving the message approving or declining the request comprises: receiving, via a physical downlink control channel, a set of uplink transmission resources different from the plurality of uplink transmission resources requested for the upcoming uplink transmission.

Aspect 11: The method of aspect 10, further comprising: determining that the set of uplink transmission resources is less than a threshold, or that a transport block segmentation is not permitted, or that a time associated with transport block segmentation is greater than a configured time gap; and dropping the upcoming uplink transmission based at least in part on the determining.

Aspect 12: The method of any of aspects 10 through 11, further comprising: determining that the set of uplink transmission resources overlaps with a second uplink transmission having a same or greater priority than the upcoming uplink transmission; and dropping the upcoming uplink transmission based at least in part on the determining.

Aspect 13: The method of any of aspects 10 through 12, further comprising: dropping the upcoming uplink transmission based at least in part on determining that the set of uplink transmission resources exceeds a packet latency bound.

Aspect 14: The method of any of aspects 10 through 13, further comprising: padding a transport block in the upcoming uplink transmission based at least in part on determining that the set of uplink transmission resources is greater than the plurality of uplink transmission resources requested for the upcoming uplink transmission.

Aspect 15: The method of any of aspects 10 through 14, further comprising: determining that the set of uplink transmission resources is greater than the plurality of uplink transmission resources requested for the upcoming uplink transmission; and performing a rate-matching to the set of uplink transmission resources with one or more bits using a circular buffer.

Aspect 16: The method of any of aspects 1 through 15, wherein the plurality of uplink transmission resources or parameters comprise at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based at least in part on a channel state information and a buffer size, or a combination thereof.

Aspect 17: The method of any of aspects 1 through 16, wherein the one or more interference measurements comprise at least one of a synchronization signal block measurement, a channel state information reference signal measurement, or both.

Aspect 18: A method for wireless communication at a network entity, comprising: transmitting, to a UE, control signaling comprising an indication of time and frequency resources that are configured for semiautonomous uplink scheduling from the UE; receiving a semiautonomous uplink scheduling message comprising a request for a plurality of uplink transmission resources or parameters for an upcoming uplink transmission, wherein the plurality of uplink transmission resources or parameters are based at least in part on one or more interference measurements performed on the time and frequency resources that are configured for semiautonomous uplink scheduling from the UE; and transmitting, to the UE and in response to transmitting the semiautonomous uplink scheduling message, a message approving or declining the request for the plurality of uplink transmission resources or parameters.

Aspect 19: The method of aspect 18, wherein transmitting the control signaling comprises: transmitting, to the UE, an indication of one or more uplink bandwidth parts that are configured for semiautonomous uplink scheduling from the UE.

Aspect 20: The method of aspect 19, further comprising: transmitting, to the UE, an indication of a starting positioning with reference to a physical resource block index or a frequency offset to a reference point associated with the one or more uplink bandwidth parts that are configured for semiautonomous uplink scheduling from the UE.

Aspect 21: The method of any of aspects 19 through 20, further comprising: transmitting, to the UE, signaling comprising a request for the UE to switch from a first uplink bandwidth part of the one or more uplink bandwidth parts to a second uplink bandwidth part of the one or more uplink bandwidth parts, wherein the one or more interference measurements are performed on the second uplink bandwidth part.

Aspect 22: The method of any of aspects 19 through 21, wherein the indication of the one or more uplink bandwidth parts comprises a bitmap indicating an index for the one or more uplink bandwidth parts, the index comprises at least one of a subframe index, a slot index, a symbol index, or a combination thereof.

Aspect 23: The method of any of aspects 19 through 22, wherein the one or more uplink bandwidth parts correspond to one or more flexible slots.

Aspect 24: The method of any of aspects 18 through 23, further comprising: transmitting, to the UE, an indication of a first uplink bandwidth part that is configured for uplink scheduling from the network entity and a second uplink bandwidth part that is configured for semiautonomous uplink scheduling from the UE; and transmitting, to the UE, signaling comprising a request for the UE to switch from the first uplink bandwidth part to the second uplink bandwidth part, wherein the one or more interference measurements are performed on the second uplink bandwidth part.

Aspect 25: The method of any of aspects 18 through 24, further comprising: transmitting, to the UE, a modification request to modify the plurality of uplink transmission resources requested for the upcoming uplink transmission.

Aspect 26: The method of any of aspects 18 through 25, wherein transmitting the message approving or declining the request comprises: transmitting, to the UE and via a physical downlink control channel, a set of uplink transmission resources different from the plurality of uplink transmission resources requested for the upcoming uplink transmission.

Aspect 27: The method of any of aspects 18 through 26, wherein the plurality of uplink transmission resources or parameters comprise at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based at least in part on a channel state information and a buffer size, or a combination thereof.

Aspect 28: The method of any of aspects 18 through 27, wherein the one or more interference measurements comprise at least one of a synchronization signal block measurement, a channel state information reference signal measurement, or both.

Aspect 29: An apparatus for wireless communication at a UE, comprising a processor; memory coupled with the processor; and instructions stored in the memory and executable by the processor to cause the apparatus to perform a method of any of aspects 1 through 17.

Aspect 30: An apparatus for wireless communication at a UE, comprising at least one means for performing a method of any of aspects 1 through 17.

Aspect 31: A non-transitory computer-readable medium storing code for wireless communication at a UE, the code comprising instructions executable by a processor to perform a method of any of aspects 1 through 17.

Aspect 32: An apparatus for wireless communication at a network entity, comprising a processor; memory coupled with the processor; and instructions stored in the memory and executable by the processor to cause the apparatus to perform a method of any of aspects 18 through 28.

Aspect 33: An apparatus for wireless communication at a network entity, comprising at least one means for performing a method of any of aspects 18 through 28.

Aspect 34: A non-transitory computer-readable medium storing code for wireless communication at a network entity, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving an indication of one or more uplink bandwidth parts that are configured for semiautonomous uplink scheduling from the UE;
   transmitting a semiautonomous uplink scheduling message comprising a request for a plurality of uplink transmission resources or parameters for an upcoming uplink transmission, wherein the plurality of uplink transmission resources or parameters are based at least in part on one or more interference measurements performed on the one or more uplink bandwidth parts; and
   receiving, in response to transmitting the semiautonomous uplink scheduling message, a message approving or declining the request for the plurality of uplink transmission resources or parameters.

2. The method of claim 1, further comprising:
   receiving an indication of a starting positioning with reference to a physical resource block index or a frequency offset to a reference point associated with the one or more uplink bandwidth parts that are configured for semiautonomous uplink scheduling from the UE.

3. The method of claim 1, further comprising:
   receiving signaling comprising a request for the UE to switch from a first uplink bandwidth part of the one or more uplink bandwidth parts to a second uplink bandwidth part of the one or more uplink bandwidth parts, wherein the one or more interference measurements are performed on the second uplink bandwidth part.

4. The method of claim 1, wherein:
   the indication of the one or more uplink bandwidth parts comprises a bitmap indicating an index for the one or more uplink bandwidth parts; and
   the index comprises at least one of a subframe index, a slot index, a symbol index, or a combination thereof.

5. The method of claim 1, wherein the one or more uplink bandwidth parts correspond to one or more flexible slots.

6. The method of claim 1, further comprising:
   performing the one or more interference measurements on the one or more uplink bandwidth parts that are configured for semiautonomous uplink scheduling from the UE; and
   determining the plurality of uplink transmission resources or parameters based at least in part on performing the one or more interference measurements.

7. The method of claim 1, further comprising:
   receiving a modification request to modify the plurality of uplink transmission resources requested for the upcoming uplink transmission.

8. The method of claim 1, wherein receiving the message approving or declining the request comprises:

receiving, via a physical downlink control channel, a set of uplink transmission resources different from the plurality of uplink transmission resources requested for the upcoming uplink transmission.

9. The method of claim 8, further comprising:
determining that the set of uplink transmission resources is less than a threshold, or that a transport block segmentation is not permitted, or that a time associated with transport block segmentation is greater than a configured time gap; and
dropping the upcoming uplink transmission based at least in part on the determining.

10. The method of claim 8, further comprising:
determining that the set of uplink transmission resources overlaps with a second uplink transmission having a same or greater priority than the upcoming uplink transmission; and
dropping the upcoming uplink transmission based at least in part on the determining.

11. The method of claim 8, further comprising:
dropping the upcoming uplink transmission based at least in part on determining that the set of uplink transmission resources exceeds a packet latency bound.

12. The method of claim 8, further comprising:
padding a transport block in the upcoming uplink transmission based at least in part on determining that the set of uplink transmission resources is greater than the plurality of uplink transmission resources requested for the upcoming uplink transmission.

13. The method of claim 8, further comprising:
determining that the set of uplink transmission resources is greater than the plurality of uplink transmission resources requested for the upcoming uplink transmission; and
performing a rate-matching to the set of uplink transmission resources with one or more bits using a circular buffer.

14. The method of claim 1, wherein the plurality of uplink transmission resources or parameters comprise at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based at least in part on a channel state information and a buffer size, or a combination thereof.

15. The method of claim 1, wherein the one or more interference measurements comprise at least one of a synchronization signal block measurement, a channel state information reference signal measurement, or both.

16. A method for wireless communication at a network entity, comprising:
transmitting, to a user equipment (UE), an indication of one or more uplink bandwidth parts that are configured for semiautonomous uplink scheduling from the UE;
receiving a semiautonomous uplink scheduling message comprising a request for a plurality of uplink transmission resources or parameters for an upcoming uplink transmission, wherein the plurality of uplink transmission resources or parameters are based at least in part on one or more interference measurements performed on the one or more uplink bandwidth parts; and
transmitting, to the UE and in response to receiving the semiautonomous uplink scheduling message, a message approving or declining the request for the plurality of uplink transmission resources or parameters.

17. The method of claim 16, further comprising:
transmitting, to the UE, an indication of a starting positioning with reference to a physical resource block index or a frequency offset to a reference point associated with the one or more uplink bandwidth parts that are configured for semiautonomous uplink scheduling from the UE.

18. The method of claim 16, further comprising:
transmitting, to the UE, signaling comprising a request for the UE to switch from a first uplink bandwidth part of the one or more uplink bandwidth parts to a second uplink bandwidth part of the one or more uplink bandwidth parts, wherein the one or more interference measurements are performed on the second uplink bandwidth part.

19. The method of claim 16, wherein:
the indication of the one or more uplink bandwidth parts comprises a bitmap indicating an index for the one or more uplink bandwidth parts; and
the index comprises at least one of a subframe index, a slot index, a symbol index, or a combination thereof.

20. The method of claim 16, wherein the one or more uplink bandwidth parts correspond to one or more flexible slots.

21. The method of claim 16, further comprising:
transmitting, to the UE, a modification request to modify the plurality of uplink transmission resources requested for the upcoming uplink transmission.

22. The method of claim 16, wherein transmitting the message approving or declining the request comprises:
transmitting, to the UE and via a physical downlink control channel, a set of uplink transmission resources different from the plurality of uplink transmission resources requested for the upcoming uplink transmission.

23. The method of claim 16, wherein the plurality of uplink transmission resources or parameters comprise at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based at least in part on a channel state information and a buffer size, or a combination thereof.

24. The method of claim 16, wherein the one or more interference measurements comprise at least one of a synchronization signal block measurement, a channel state information reference signal measurement, or both.

25. An apparatus for wireless communication at a user equipment (UE), comprising:
a processor;
memory coupled with the processor; and
instructions stored in the memory and executable by the processor to cause the apparatus to:
receive an indication of one or more uplink bandwidth parts that are configured for semiautonomous uplink scheduling from the UE;
transmit a semiautonomous uplink scheduling message comprising a request for a plurality of uplink transmission resources or parameters for an upcoming uplink transmission, wherein the plurality of uplink transmission resources or parameters are based at least in part on one or more interference measurements performed on the one or more uplink bandwidth parts; and
receive, in response to transmitting the semiautonomous uplink scheduling message, a message approving or declining the request for the plurality of uplink transmission resources or parameters.

26. The apparatus of claim 25, further comprising: receiving an indication of a starting positioning with reference to a physical resource block index or a frequency offset to a reference point associated with the one or more uplink bandwidth parts that are configured for semiautonomous uplink scheduling from the UE.

27. The apparatus of claim 25, wherein the plurality of uplink transmission resources or parameters comprise at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based at least in part on a channel state information and a buffer size, or a combination thereof.

28. The apparatus of claim 26, wherein the plurality of uplink transmission resources or parameters comprise at least one of a quantity of symbols, a quantity of resource blocks, a quantity of layers, a quantity of demodulation reference signals, a phase tracking reference signal density, a transmit power, a modulation and coding scheme, a hybrid automatic repeat request identifier based at least in part on a channel state information and a buffer size, or a combination thereof.

29. An apparatus for wireless communication at a network entity, comprising:
a processor;
memory coupled with the processor; and
instructions stored in the memory and executable by the processor to cause the apparatus to:
transmit, to a user equipment (UE), an indication of one or more uplink bandwidth parts that are configured for semiautonomous uplink scheduling from the UE;
receive a semiautonomous uplink scheduling message comprising a request for a plurality of uplink transmission resources or parameters for an upcoming uplink transmission, wherein the plurality of uplink transmission resources or parameters are based at least in part on one or more interference measurements performed on the one or more uplink bandwidth parts; and
transmit, to the UE and in response to receiving the semiautonomous uplink scheduling message, a message approving or declining the request for the plurality of uplink transmission resources or parameters.

30. The apparatus of claim 29, further comprising:
transmitting, to the UE, an indication of a starting positioning with reference to a physical resource block index or a frequency offset to a reference point associated with the one or more uplink bandwidth parts that are configured for semiautonomous uplink scheduling from the UE.

* * * * *